United States Patent
Tokumoto

(10) Patent No.: US 11,920,626 B2
(45) Date of Patent: Mar. 5, 2024

(54) NON-LOOSENING BOLT

(71) Applicant: Toshimitu Tokumoto, Akashi (JP)

(72) Inventor: Toshimitu Tokumoto, Akashi (JP)

( * ) Notice: Subject to any disclaimer, the term of this patent is extended or adjusted under 35 U.S.C. 154(b) by 316 days.

(21) Appl. No.: 17/511,588

(22) Filed: Oct. 27, 2021

(65) Prior Publication Data

US 2022/0049738 A1 Feb. 17, 2022

Related U.S. Application Data

(63) Continuation-in-part of application No. PCT/JP2020/016737, filed on Apr. 16, 2020.

(30) Foreign Application Priority Data

Apr. 30, 2019 (JP) ................................. 2019-087074

(51) Int. Cl.
*F16B 39/34* (2006.01)
*F16B 35/00* (2006.01)
*F16B 39/282* (2006.01)

(52) U.S. Cl.
CPC .............. *F16B 39/34* (2013.01); *F16B 35/00* (2013.01); *F16B 39/282* (2013.01)

(58) Field of Classification Search
CPC ........ F16B 5/025; F16B 33/002; F16B 33/02; F16B 35/00; F16B 35/041; F16B 35/06; F16B 39/00; F16B 39/282; F16B 39/34

(Continued)

(56) References Cited

U.S. PATENT DOCUMENTS 945,370 A * 1/1910 Braddock ............... F16B 35/00
411/397
2,517,361 A * 8/1950 Staats ................... B64D 17/383
403/DIG. 4

(Continued)

FOREIGN PATENT DOCUMENTS

JP S48-049461 U1 6/1973
JP H10-089334 A 4/1998

(Continued)

OTHER PUBLICATIONS

International Search Report (ISR) dated Mar. 24, 2020 in PCT/JP2020/003078 filed Jan. 29, 2020 and published as WO 2020 116666 A1 and WO 2020 116666 A8 dated Jun. 11, 2020, of which International Application possibly related U.S. Appl. No. 17/930,002 is a continuation-in-part.

(Continued)

*Primary Examiner* — Roberta S Delisle
(74) *Attorney, Agent, or Firm* — JTT Patent Services, LLC; Gerald T. Peters

(57) ABSTRACT

Provided in the context of a bolt is a method for achieving antiloosening capability such as will make it possible for tightening operations to be carried out easily and rapidly, and such as will make it possible to obtain antiloosening effect in robust and reliable fashion. Comprised, in such form as if a single bolt had been cut into two perpendicularly with respect to an axis thereof at a location midway along the axis thereof, of first bolt 11 having a bolt head and second bolt 12 having a threaded tip; second bolt 12 being such that an eccentric columnar portion 123 which is smaller in diameter than a diameter of the shaft of the second bolt 12 is provided at cutting plane 122 in such fashion as to protrude outward in an axial direction in eccentric fashion with respect to a direction perpendicular to a central axis, and such that side face protrusion 124 is formed at an outside (Continued)

circumferential side face of eccentric columnar portion 123; first bolt 11 being such that eccentric cylindrical portion 113 that mates with eccentric columnar portion 123 is formed at cutting plane 112 in eccentric fashion with respect to a direction perpendicular to a central axis, axial groove 114 being formed in a direction parallel to the central axis and radial groove 115 being formed in a radial direction at the interior thereof; the entirety constituting locking bolt 1.

16 Claims, 34 Drawing Sheets

(58) Field of Classification Search
USPC ........ 411/190, 191–192, 378, 381–382, 383, 411/396–397, 411, 424
See application file for complete search history.

(56) References Cited

U.S. PATENT DOCUMENTS

| | | | | |
|---|---|---|---|---|
| 3,298,273 | A * | 1/1967 | McKelvey | F16B 35/00 411/1 |
| 4,022,099 | A * | 5/1977 | Ballantyne | F16B 25/0021 411/383 |
| 4,309,140 | A * | 1/1982 | Steffen | F16B 39/38 411/264 |
| 5,785,476 | A * | 7/1998 | McDonnell | F16B 15/00 411/908 |
| 7,588,402 | B2 * | 9/2009 | Chuang | F16B 25/103 411/383 |
| 8,506,226 | B2 * | 8/2013 | Martinez | F16B 35/02 411/383 |
| 2009/0175701 | A1 * | 7/2009 | Wu | F16B 35/045 411/383 |
| 2022/0049738 | A1 | 2/2022 | Tokumoto | |
| 2022/0412393 | A1 | 12/2022 | Tokumoto | |

FOREIGN PATENT DOCUMENTS

| | | |
|---|---|---|
| JP | 2000-074031 A | 3/2000 |
| JP | 2001-311417 A | 11/2002 |
| JP | 2010-043678 A | 2/2010 |
| JP | 3186719 U | 10/2013 |
| JP | 3187298 U | 11/2013 |
| JP | 2018-040495 A | 3/2018 |
| JP | 6640967 B1 | 2/2020 |
| JP | 2020-091019 A | 6/2020 |
| JP | 2020-183772 A | 11/2020 |
| JP | 6892892 B2 | 6/2021 |
| JP | 20214-139471 A | 9/2021 |
| WO | 2020 116666 A1 | 6/2020 |
| WO | 2020 222298 A1 | 11/2020 |
| WO | 2021 177384 A1 | 9/2021 |

OTHER PUBLICATIONS

International Preliminary Report on Patentability (IPRP) dated Jun. 8, 2021 in PCT/JP2020/003078 filed Jan. 29, 2020 and published as WO 2020 116666 A1 and WO 2020 116666 A8 dated Jun. 11, 2020, of which International Application possibly related U.S. Appl. No. 17/930,002 is a continuation-in-part.
International Search Report (ISR) dated Jun. 23, 2020 in PCT/JP2020/016737 filed Apr. 16, 2020 and published as WO 2020 222298 A1 dated Nov. 5, 2020, of which International Application the present application and possibly related U.S. Appl. No. 17/930,002 are continuations-in-part.
International Preliminary Report on Patentability (IPRP) dated approximately Mar. 26, 2021 in PCT/JP2020/016737 filed Apr. 16, 2020 and published as WO 2020 222298 A1 dated Nov. 5, 2020, of which International Application the present application and possibly related U.S. Appl. No. 17/930,002 are continuations-in-part.
International Search Report (ISR) dated May 18, 2021 in PCT/JP2021/008298 filed Mar. 3, 2021 and published as WO 2021 177384 A1 dated Sep. 10, 2021, of which International Application possibly related U.S. Appl. No. 17/930,002 is a continuation-in-part.
International Preliminary Report on Patentability (IPRP) dated Sep. 6, 2022 in PCT/JP2021/008298 filed Mar. 3, 2021 and published as WO 2021 177384 A1 dated Sep. 10, 2021, of which International Application possibly related U.S. Appl. No. 17/930,002 is a continuation-in-part.
Applicant brings to the attention of the Examiner the fact that Box VII-2 of the Request in PCT/JP2021/008298 filed Mar. 3, 2021 and pubd as WO 2021 177384 A1 on Sep. 10, 2021, of which Intl App possibly related U.S. Appl. No. 17/930,002 is a continuation-in-part, contained a request to use the search results of a previous app, i.e., JP Pat App No. 2018-229875 filed Dec. 7, 2018. See NPL Cite Nos. 1-2, 5-6, and 8. This concise explanation will serve in lieu of translation.
Applicant brings to the attention of the Examiner the fact that Box VI-1 of the Request in PCT/JP2020/003078 filed Jan. 29, 2020 and pubd as WO 2020 116666 A1/A8 on Jun. 11, 2020, of which Intl App possibly related U.S. Appl. No. 17/930,002 is a CIP, contained a request—which was ultimately denied—to restore the priority of JP Pat App No. 2018-229875 filed Dec. 7, 2018. See NPL Cite Nos. 1-2, 5-6, and 7. This concise explanation will serve in lieu of translation.
Applicant brings to attention of Examiner the existence of possibly related U.S. Appl. No. 17/511,588, filed Oct. 27, 2021 and pubd as US 2022 0412393 A1 on Dec. 29, 2022, which is a CIP of PCT/JP2021/008298 filed Mar. 3, 2021 and pubd as WO 2021 177384 A1 on Sep. 10, 2021, the '298 app being a CIP of PCT/JP2020/003078 filed Jan. 29, 2020 and pubd as WO 2020 116666 A1 on Jun. 11, 2020, the '002 app being a CIP of U.S. Appl. No. 17/511,588, filed Oct. 27, 2021 and pubd as US 2022 0049738 A1 on Feb. 17, 2022, all of which have overlapping inventorship/ownership with the present case.

* cited by examiner

NON-LOOSENING BOLT

INCORPORATION BY REFERENCE

This application is a continuation-in-part of and claims benefit under 35 USC 120 and 365(c) to copending International Application No. PCT/JP2020/016737, entitled "Non-Loosening Bolt", filed 16 Apr. 2020; and further claims benefit of priority under 35 USC 119(a)-(d) to Japanese Patent Application No 2019-087074, entitled "Non-Loosening Bolt", filed 30 Apr. 2019, the contents of both of which applications are incorporated herein in their entireties by reference.

TECHNICAL FIELD

The present invention relates to a nonloosening bolt. In particular, it relates to a bolt which has antiloosening capability and which may be used as a tap bolt.

BACKGROUND ART

When a tap bolt is subjected to vibration or impact, it is known that a gap can form momentarily between the bolt and the surface against which it is tightened, such that a load no longer acts on the bolt, in accompaniment to which rotation of the bolt may occur and there may be occurrence of loosening. To prevent such loosening of bolts, a locking-wire technique has been known conventionally in which two bolts are employed, the heads of the respective bolts being joined by wire, the wire being installed in such fashion that a pull on the wire in a direction such as would occur if one of the bolts were to loosen produces a pull in a direction such as would cause the other bolt to tighten.

However, with the foregoing conventional locking-wire technique, not only are two bolts and two bolt holes required, but there has also been the problem that it is poor in terms of ease of operations, since it requires that an operation be carried out in which a wire is installed at the heads of the two bolts.

PATENT REFERENCES

Patent Reference No. 1: Japanese Patent Application No. 2018-229875

SUMMARY OF THE INVENTION

Problem to be Solved by Invention

The present invention solves the problems of the conventional bolt locking technique which employs wire, and provides a bolt locking technique in which a single bolt hole and a bolt in a single bolt-like state are employed, which permits the bolt locking operation to be carried out easily and rapidly, and which makes it possible to obtain antiloosening effect in robust and reliable fashion.

Means for Solving Problem

To solve the foregoing problems, a locking bolt in accordance with the present invention is a locking bolt comprising, in such form as if a single bolt had been cut into two perpendicularly with respect to an axis thereof at a location midway along the axis thereof, a first bolt having a bolt head and a second bolt having a threaded tip, wherein the first bolt and the second bolt respectively have, at the outside circumference thereof, male threads that threadedly engage with a single bolt hole;

at the second bolt, an eccentric columnar portion which is smaller in diameter than a diameter of the second bolt is provided at a location toward a cutting plane between it and the first bolt in such fashion as to protrude outward in an axial direction in eccentric fashion with respect to a direction perpendicular to a central axis of the second bolt, and a side face protrusion is formed at a portion of an outside circumferential side face of the eccentric columnar portion in such fashion as to protrude outward in a radial direction;

at the first bolt, an eccentric cylindrical portion which is a cylindrical hole that is smaller in diameter than a diameter of the second bolt and that mates with the eccentric columnar portion of the second bolt is formed at a cutting plane of the first bolt in eccentric fashion with respect to a direction perpendicular to a central axis of the first bolt, an axial groove and a radial groove being formed at the interior thereof;

after the side face protrusion of the eccentric columnar portion and the axial groove of the eccentric cylindrical portion are aligned and the eccentric columnar portion of the second bolt is captured within the eccentric cylindrical portion of the first bolt to the point where the cutting planes come in contact in mutually opposed fashion, causing the side face protrusion of the eccentric columnar portion to move along the radial groove of the eccentric cylindrical portion until an end of the groove is reached as a result of rotation of the second bolt results in a constitution in which pitches and central axes of external threaded portions of the two are aligned; and the second bolt is moreover provided with a recess for rotational actuation.

Describing a method of using this locking bolt, prior to being deployed, the eccentric columnar portion of the second bolt is mated with the eccentric cylindrical portion of the first bolt in such fashion as to achieve a state such that the cutting planes come in contact in mutually opposed fashion and in such fashion as to achieve a state in which these are placed in position such that the pitches and central axes of the external threaded portions of the two are aligned and in such fashion as to achieve a single bolt-like state; and during use as a nonloosening tap bolt, the first bolt and the second bolt, while still in that state in which they were placed in position, are rotated in a direction such as tends to cause tightening within a bolt hole until a prescribed torque acts on the entire bolt, following which a rotation tool is inserted from the exterior so as to be captured within the recess for rotational actuation provided at the second bolt, and only the second bolt is made to rotate by a prescribed angle in the same direction as the direction of this rotation. As a result, the locking effect due to the misalignment in the radial direction permits achievement of antiloosening capability.

This locking bolt has the excellent characteristic that after the first bolt and the second bolt are combined to achieve a single bolt-like state and this is rotated in a direction such as tends to cause tightening, performing the comparatively easy and rapid operation of causing only the second bolt to be rotated by a prescribed angle in the same direction as the direction of this rotation makes it possible to obtain robust and reliable antiloosening effect.

BENEFIT OF THE INVENTION

The present invention makes it possible to provide a locking bolt which is such that when a first bolt and a second bolt are combined to achieve a single bolt-like state, the bolt tightening procedure can be carried out comparatively easily and rapidly, and robust and reliable antiloosening effect can be obtained.

EMBODIMENTS FOR CARRYING OUT THE INVENTION

Examples of embodiments of locking bolts will be described using the drawings.

As the embodiments below are merely examples for the purpose of describing the present invention, it should be understood that the present invention is not limited to the specific embodiments below.

Working Example 1

Figure 1:
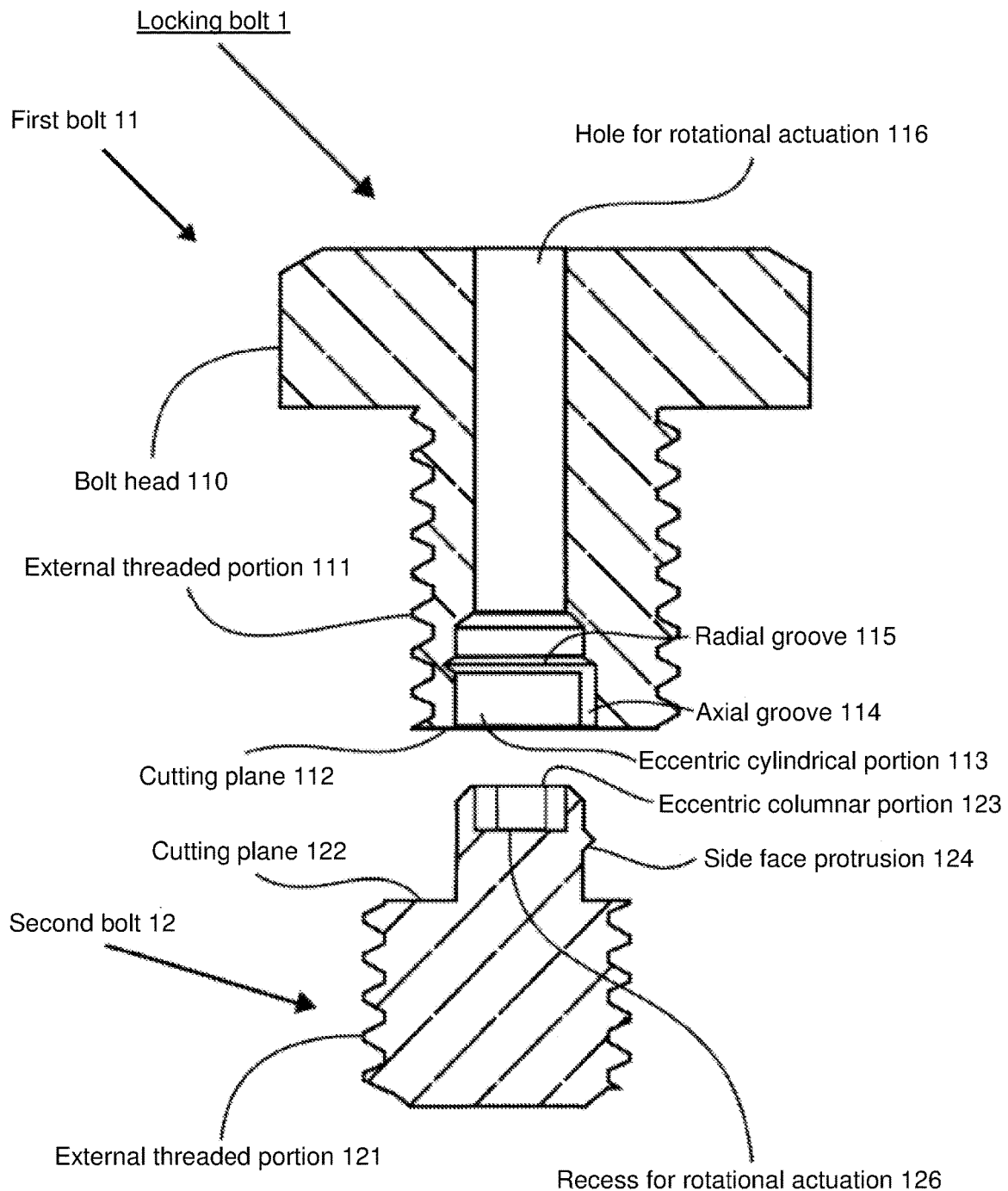
FIG. 1 Sectional view of a locking bolt in which a first bolt has a through-hole, and in which there is a recess for rotational actuation at the top portion of an eccentric columnar portion at a second bolt.
Figure 2:
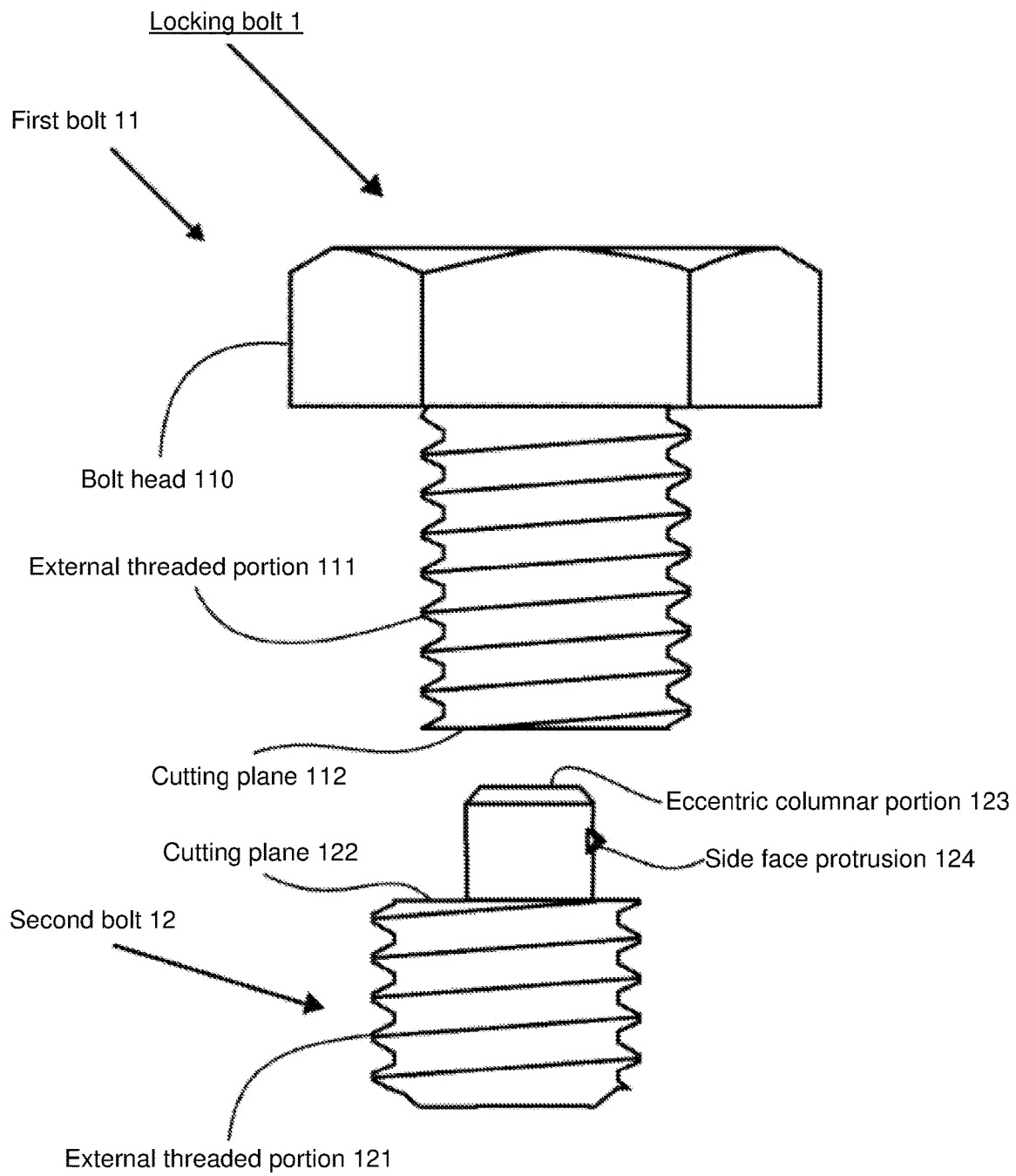
FIG. 2 Front view of the locking bolt of FIG. 1.
Figure 3:
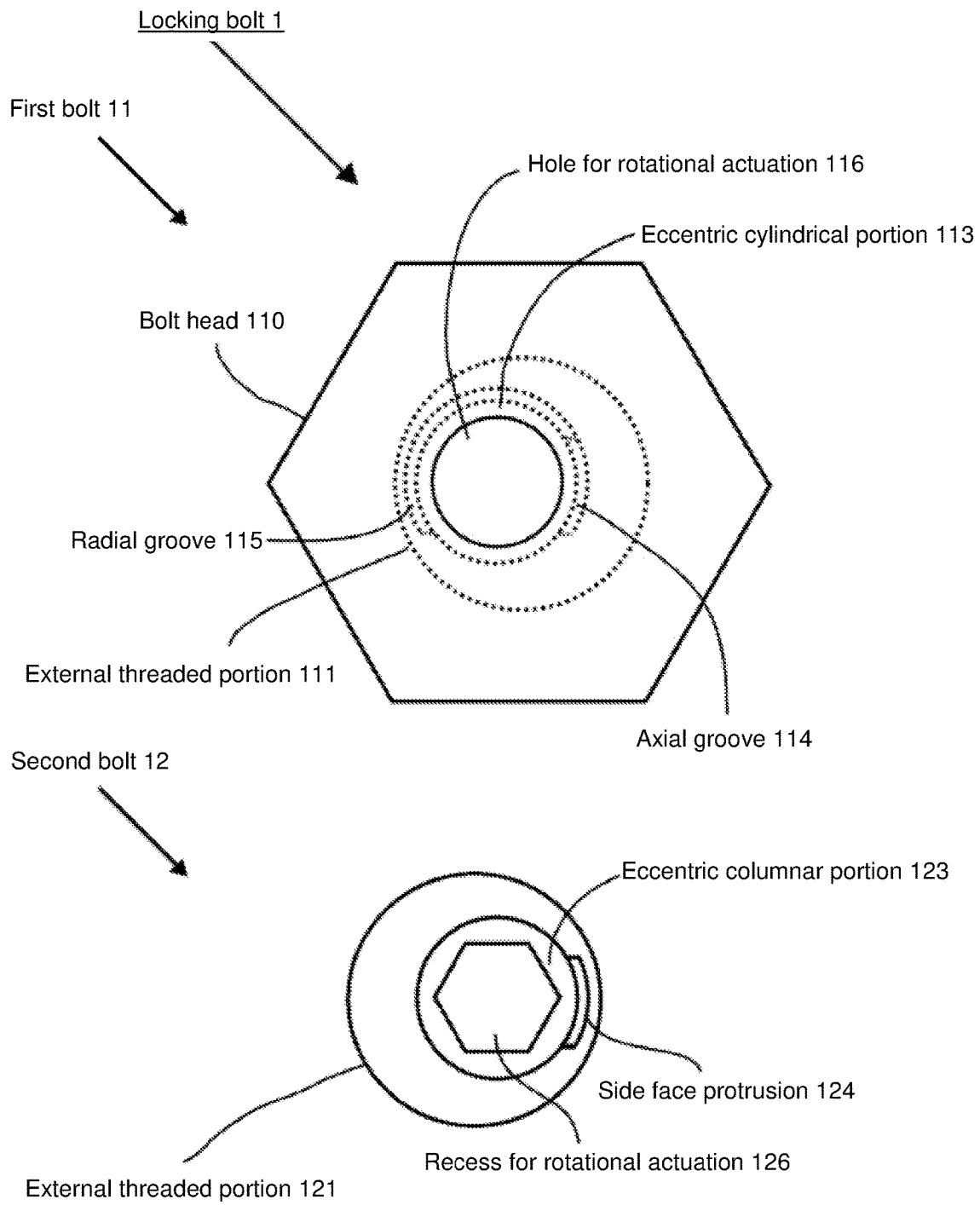
FIG. 3 Top view of the locking bolt of FIG. 1.

As shown by way of example in FIG. 1, locking bolt 1 comprises first bolt 11 and second bolt 12.

1. First Bolt 11

First bolt 11 has an external threaded portion 111 which is threaded for threaded engagement with bolt hole 13 at the outside circumference thereof. In accordance with the present embodiment, as viewed from the side, first bolt 11 is a bolt which is equipped with a bolt head 110 and which is equipped with a male-threaded external threaded portion 111 at the outside circumference thereof.

In addition, at first bolt 11, eccentric cylindrical portion 113 is formed at cutting plane 112 between it and second bolt 12.

Eccentric cylindrical portion 113 is smaller than the diameter of first bolt 11. Furthermore, eccentric cylindrical portion 113 is formed so as to be eccentric in a direction perpendicular to the central axis of first bolt 11, axial groove 114 which is parallel to the axial direction of first bolt 11 and radial groove 115 which is parallel to the radial direction of first bolt 11 being formed at the interior thereof.

Moreover, at first bolt 11, a hole 116 for rotational actuation which extends all the way through first bolt 11 to reach eccentric cylindrical portion 113 is formed in a direction parallel to the central axis of first bolt 11.

2. Second Bolt 12

Second bolt 12 also has an external threaded portion 121 which is threaded for threaded engagement with bolt hole 13 at the outside circumference thereof. External threaded portion 121 has the same pitch and is in the same direction as external threaded portion 111 so as to be continuous with external threaded portion 111 of first bolt 11.

In accordance with the present embodiment, second bolt 12 as viewed from the side is of columnar shape and has external threaded portion 121 at the outside circumference thereof, the external appearance thereof as viewed from the side being that of a bolt which does not have a bolt head.

In addition, at second bolt 12, eccentric columnar portion 123 is provided in protruding fashion at cutting plane 122 between it and first bolt 11. This eccentric columnar portion 123 is of smaller diameter than the diameter of bolt 12. Furthermore, eccentric columnar portion 123 is provided in protruding fashion so as to be eccentric in a direction perpendicular to the central axis of second bolt 12. The eccentric dimension of eccentric columnar portion 123 with respect to the central axis of second bolt 12 is equal to the eccentric dimension of eccentric cylindrical portion 113 with respect to the central axis of first bolt 11 at first bolt 11.

Furthermore, side face protrusion 124 is formed at the outside circumferential side face of eccentric columnar portion 123, side face protrusion 124 being of such size as to engage in the axial direction with axial groove 114 formed at eccentric cylindrical portion 113, side face protrusion 124 moreover being of such size as to engage in the radial direction with radial groove 115 formed at eccentric cylindrical portion 113, and these being formed in such fashion as to cause the distance between cutting plane 122 and side face protrusion 124 and the distance between cutting plane 112 and radial groove 115 to be equal.

Figure 4:
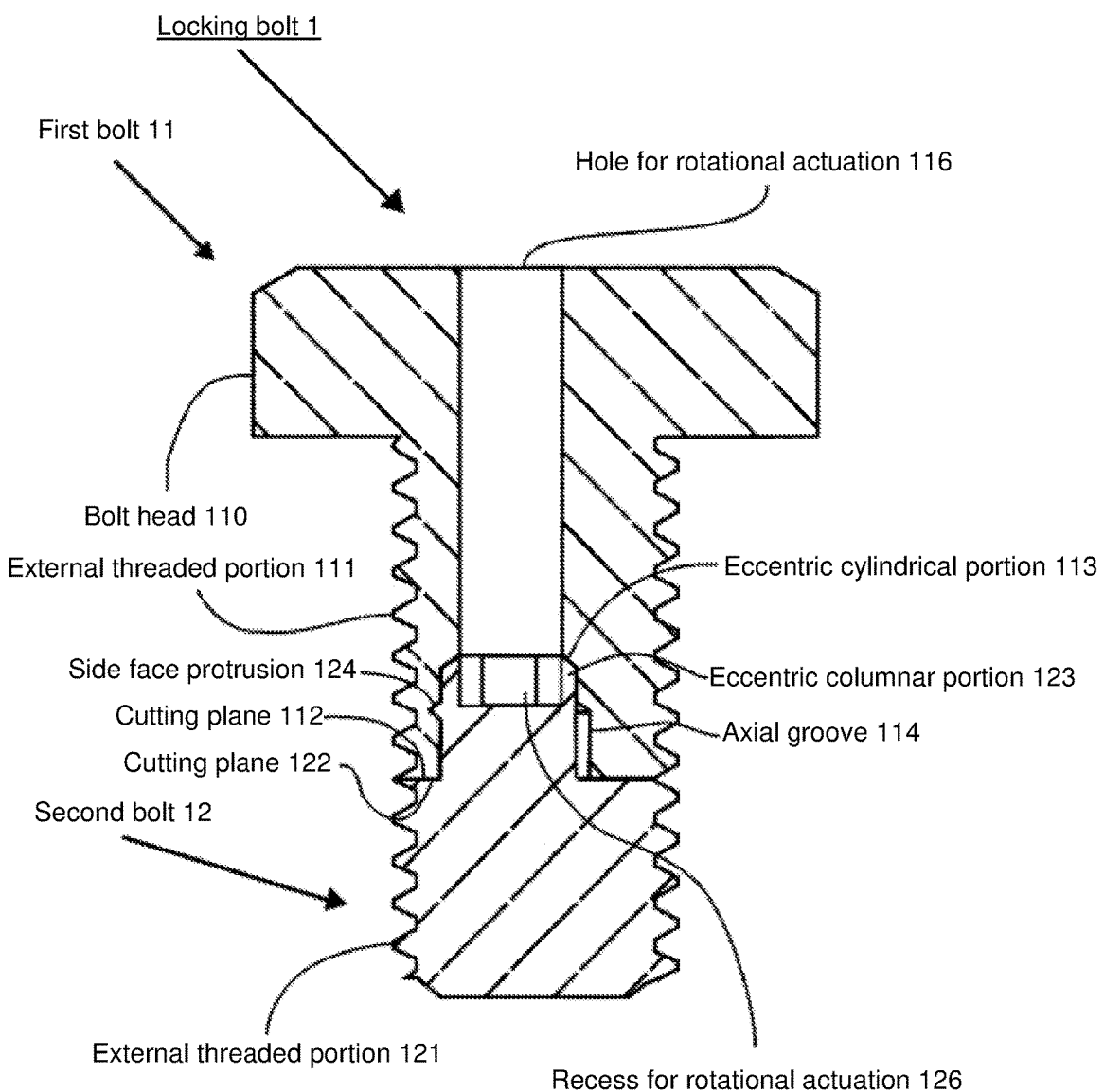
FIG. 4 Sectional view showing the locking bolt of FIG. 1 in a state in which the first bolt and the second bolt are combined.
Figure 5:
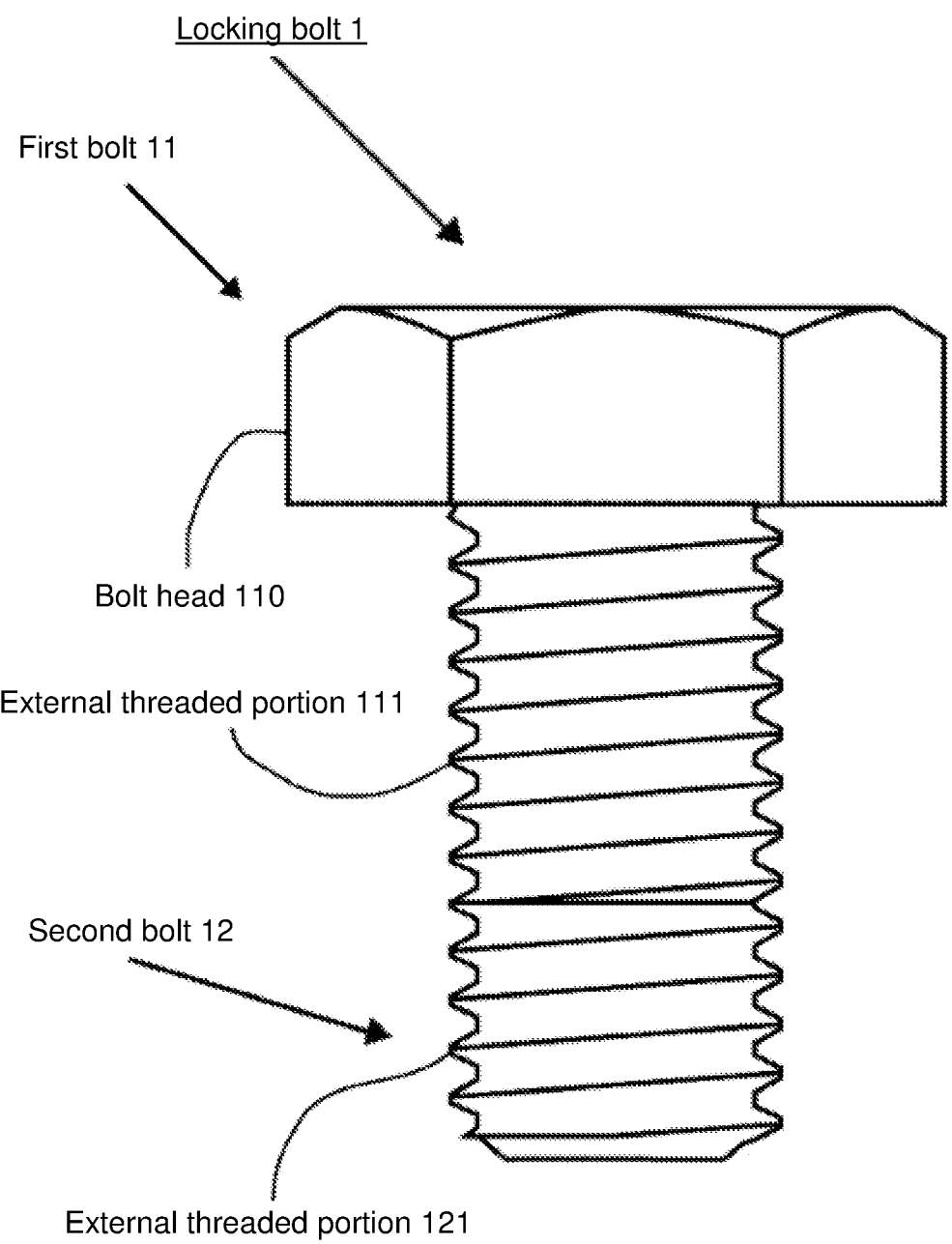
FIG. 5 Front view showing the locking bolt of FIG. 1 in a state in which the first bolt and the second bolt are combined.

When as shown by way of example in FIG. 4 side face protrusion 124 is aligned with axial groove 114 and eccentric columnar portion 123 of second bolt 12 is captured within eccentric cylindrical portion 113 of first bolt 11 to the point where cutting plane 112 and cutting plane 122 of first bolt 11 and second bolt 12 come in contact in mutually opposed fashion, because side face protrusion 124 of eccentric columnar portion 123 and radial groove 115 of eccentric cylindrical portion 113 will be aligned, causing movement of side face protrusion 124 of eccentric columnar portion 123 along radial groove 115 of eccentric cylindrical portion 113 until the end of the groove is reached as a result of rotation of second bolt 12 in a direction such as will cause the external threads thereof to loosen results in a constitution as shown by way of example in FIG. 4 and FIG. 5 in which first bolt 11 and second bolt 12 are such that the pitches and central axes of the external threaded portion 111 and the external threaded portion 121 of the two are aligned.

In addition, as shown by way of example at FIG. 4, recess 126 for rotational actuation is formed at the top face of eccentric columnar portion 123, this being formed so as to be disposed directly below hole 116 for rotational actuation which extends all the way through first bolt 11.

3. Method of Using Locking Bolt 1

3.1 Prior to Deployment (Prior to Fastening)

Before carrying out fastening using locking bolt 1, first bolt 11 and second bolt 12 are combined and placed in position. More specifically, this is made to assume a state in which side face protrusion 124 is aligned with axial groove 114 and eccentric columnar portion 123 of second bolt 12 is captured within eccentric cylindrical portion 113 of first bolt 11 to the point where cutting plane 112 and cutting plane 122 of first bolt 11 and second bolt 12 come in contact in mutually opposed fashion, and side face protrusion 124 of eccentric columnar portion 123 is made to move along radial groove 115 of eccentric cylindrical portion 113 until the end of the groove is reached as a result of rotation of second bolt 12.

As shown in FIG. 5, when in this state, first bolt 11 and second bolt 12 will be aligned as seen in plan view, while at the same time the pitches and central axes of the external threaded portion 111 and the external threaded portion 121 of the two will be aligned. This being the case, first bolt 11 and second bolt 12 can be threadedly engaged with bolt hole 13 as if they were a single bolt.

3.2 During Fastening

In addition, during fastening of locking bolt 1, first bolt 11 and second bolt 12 which have been placed in position are first threadedly engaged with bolt hole 13 and are rotated in a direction such as will cause tightening until a prescribed torque acts thereon.

Figure 6:
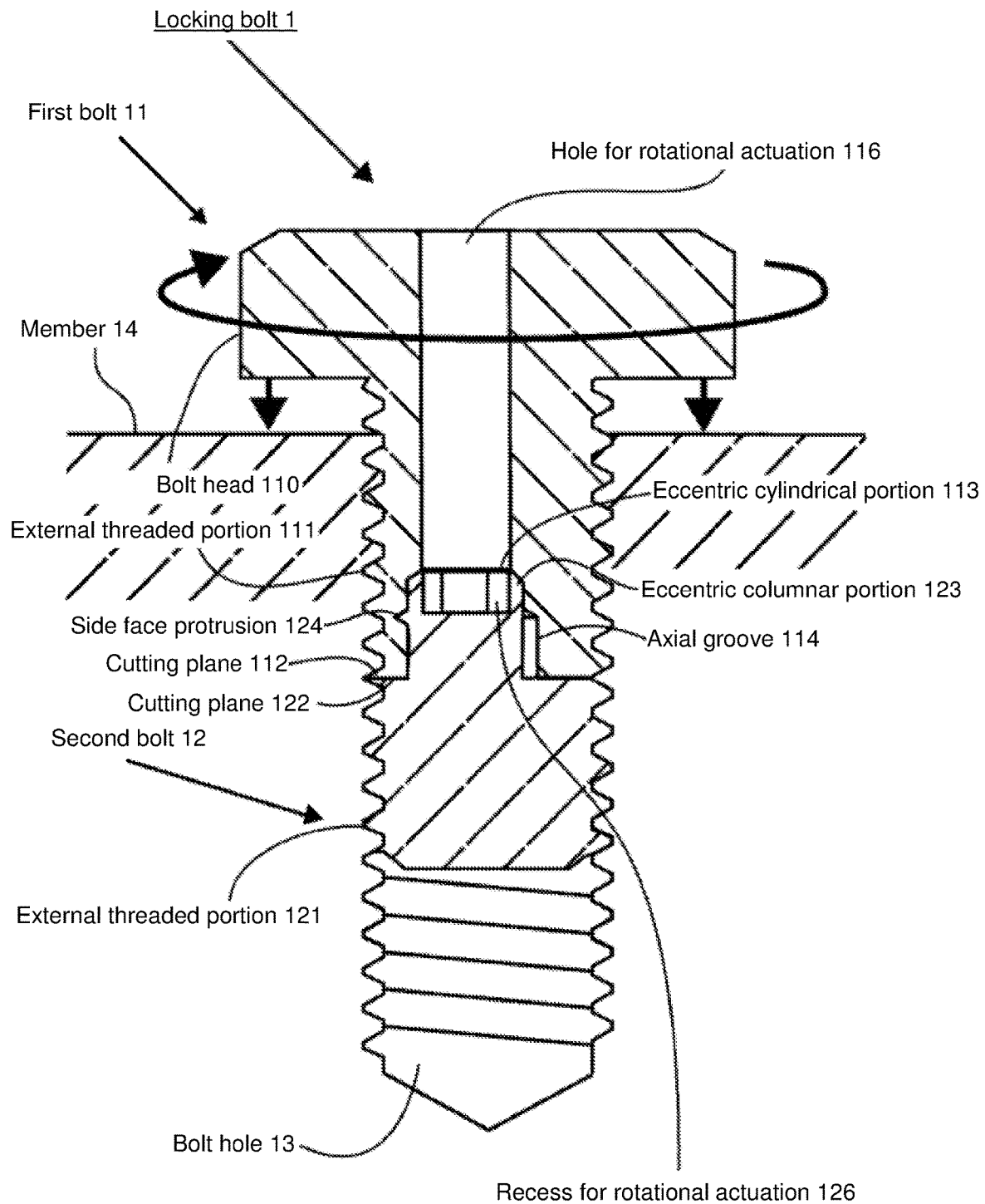
FIG. 6 Sectional view showing the situation that exists when the first bolt and the second bolt at the locking bolt of FIG. 1 are combined, and this is rotated in a direction such as tends to cause tightening, causing it to be captured within the bolt hole.

At such time, as shown in FIG. 6, force may be applied to bolt head 110 of first bolt 11 relative to bolt hole 13 to cause rotation in a direction such as will cause tightening until a prescribed torque acts on bolt hole 13.

Here, because first bolt 11 and second bolt 12 are in a state such that second bolt 12 is made to rotate in a direction such as will cause loosening with respect to the external threads such that side face protrusion 124 of eccentric columnar portion 123 is made to move along radial groove 115 of eccentric cylindrical portion 113 until the end of the groove is reached, when a force is applied to bolt head 110 of first bolt 11 to cause rotation in a direction such as will cause tightening as shown in FIG. 6, second bolt 12 will move in such fashion as to follow this motion.

Figure 7:
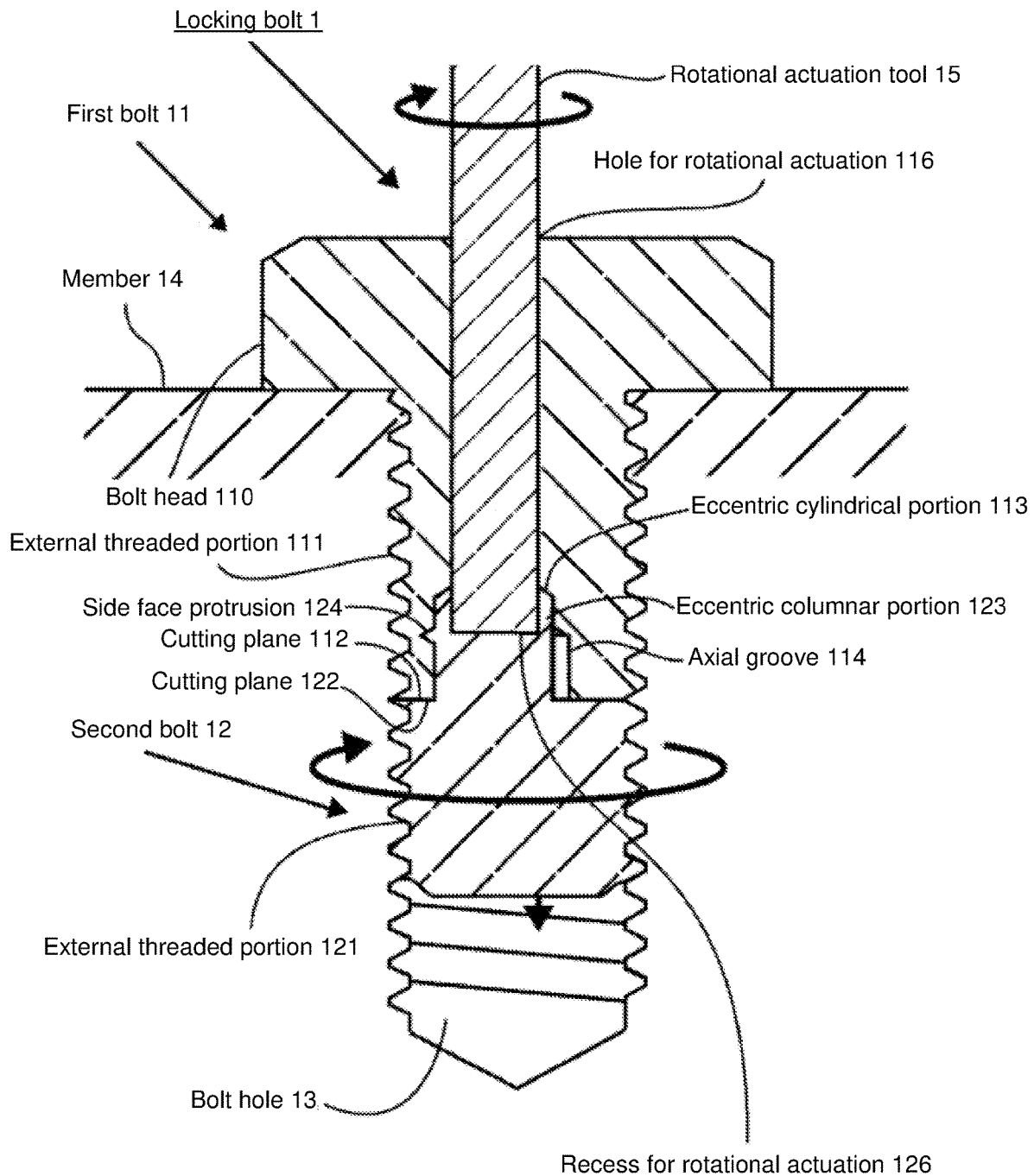
FIG. 7 Sectional view showing the situation that exists when, after the locking bolt of FIG. 1 has been placed in the state shown in FIG. 6, the entire locking bolt is completely captured by the bolt hole, following which only the second bolt is made to rotate by a prescribed angle relative to the first bolt.

As shown in FIG. 7, rotational actuation tool 15 is thereafter inserted in hole 116 for rotational actuation at first bolt 11 and is captured by recess 126 for rotational actuation at second bolt 12, and only second bolt 12 is made to rotate by a prescribed angle in the same direction as the direction that would cause tightening thereof relative to first bolt 11. As the prescribed angle, while this will vary depending on the amount of eccentricity relative to the central axis of second bolt 12 and the size of the gap in the axial direction between the radial groove and the side face protrusion, this is within the range 5° to 180°.

By so doing, the locking effect due to the misalignment in the radial direction permits achievement of antiloosening capability.

Thus, a locking bolt in accordance with the present invention has the excellent characteristic that after member 14 is fastened by first bolt 11 and second bolt 12, causing only second bolt 12 to be further rotated by a prescribed angle makes it possible to obtain antiloosening effect in a manner that is easy and rapid as well as robust and reliable.

Working Example 2

Figure 8:
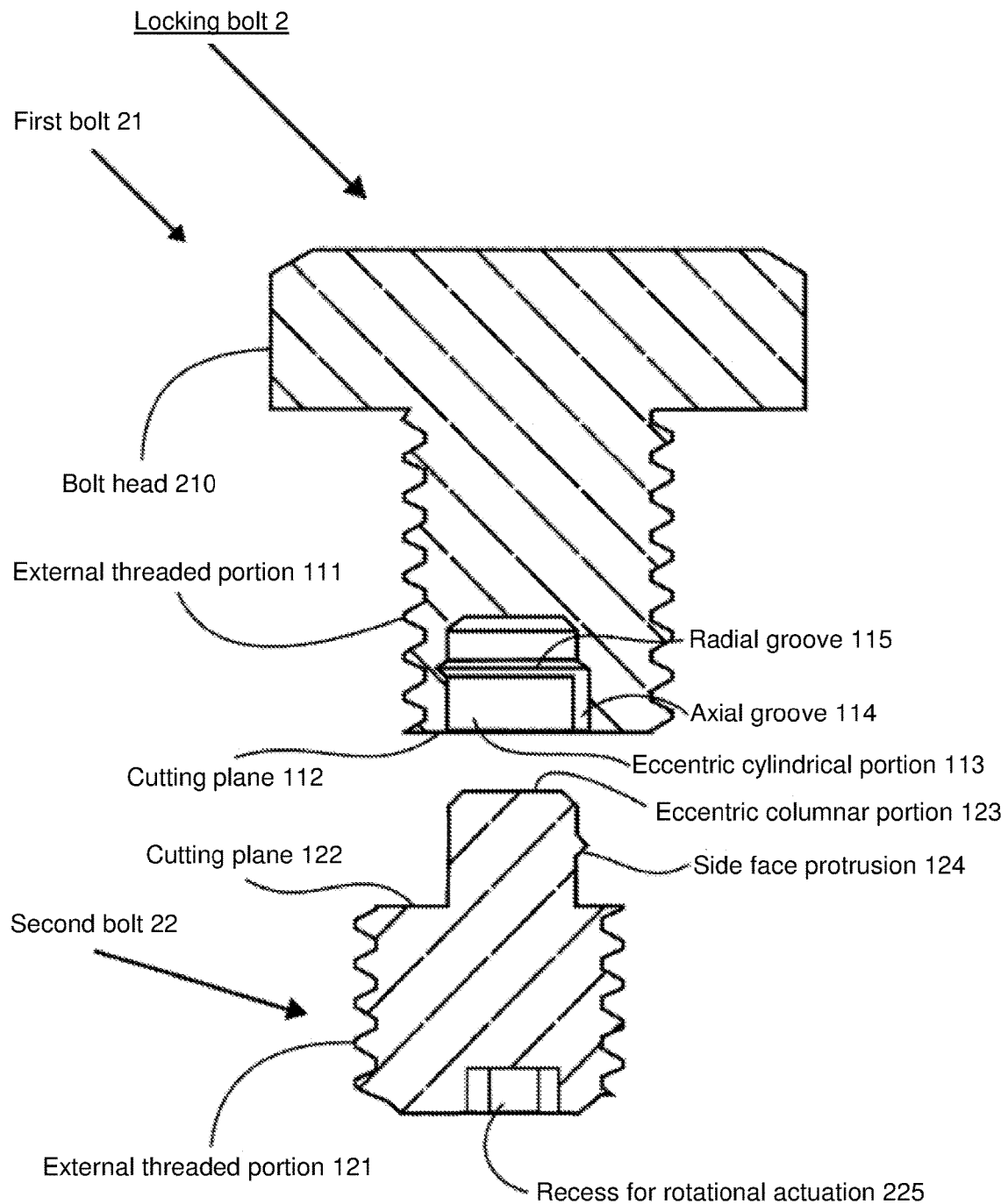
FIG. 8 Sectional view of locking bolt provided with a recess such as will permit rotational actuation at a location toward the threaded tip of a second bolt.
Figure 9:
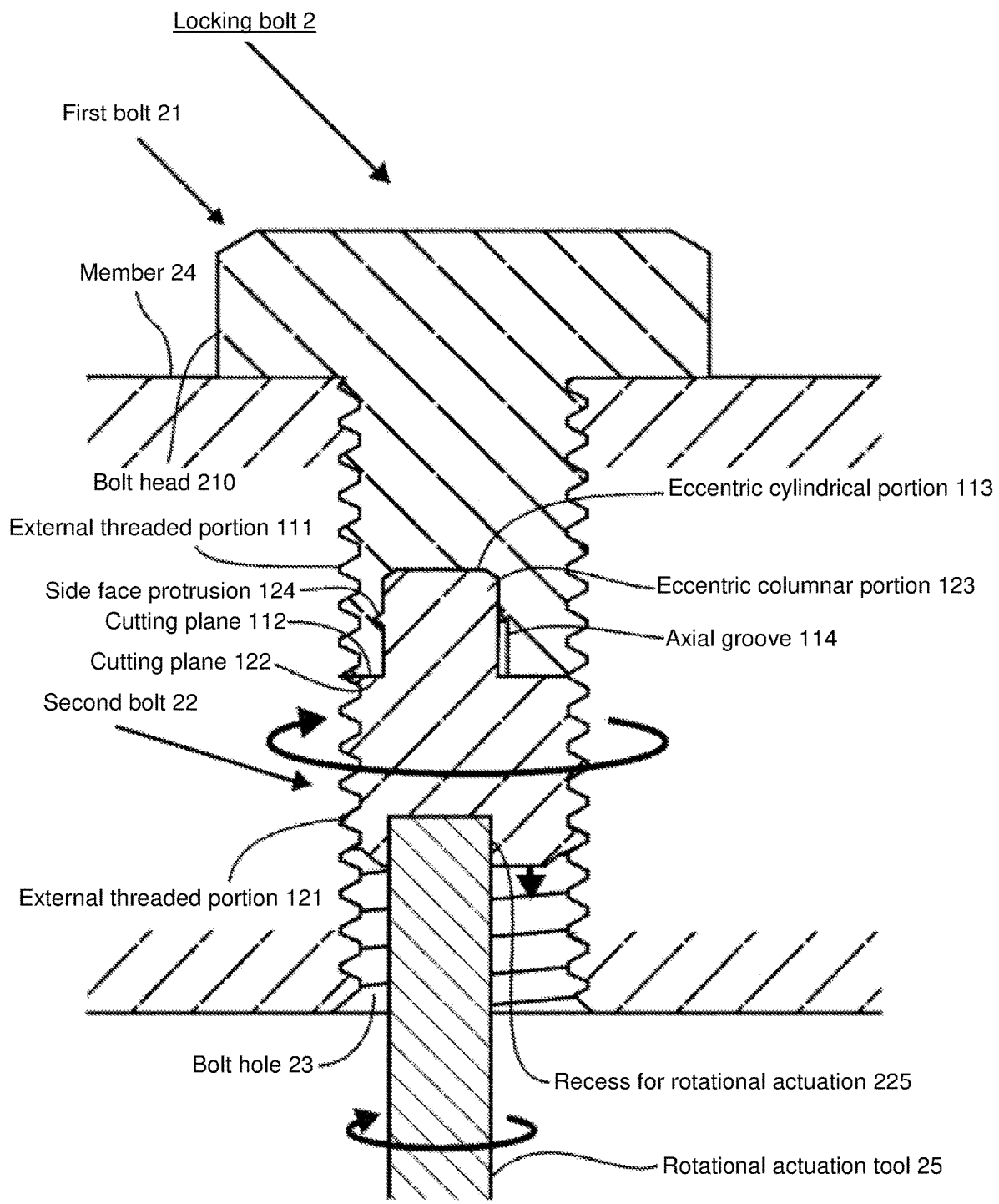
FIG. 9 Sectional view showing the situation that exists when the locking bolt of FIG. 8 is placed in a state in which the first bolt and the second bolt are combined, this is rotated in a direction such as tends to cause tightening, and the entire locking bolt is completely captured by the bolt hole, following which only the second bolt is made to rotate by a prescribed angle relative to the first bolt.

When as shown in FIG. 9 bolt hole 23 extends through member 24, permitting rotational actuation tool 25 to be used from a location below bolt hole 23, recess 225 for rotational actuation such as will permit rotational actuation from the exterior is provided at the threaded tip face on the side opposite cutting plane 122 at second bolt 22 as shown in FIG. 8.

As was the case at Working Example 1, after locking bolt 2 has been fastened within bolt hole 23, rotational actuation tool 25 is inserted by way of the hole made by the through-hole at the face on the side opposite the face against which locking bolt 2 is fastened within bolt hole 23 as shown in FIG. 9, and is captured by recess 225 for rotational actuation at second bolt 22, and only second bolt 22 is made to rotate relative to first bolt 21 by a prescribed angle in the same direction as the direction that would cause tightening of first bolt 21.

By so doing, the locking effect due to the misalignment in the radial direction makes it possible to obtain antiloosening effect in a manner that is easy and rapid as well as robust and reliable.

Working Example 3

Figure 10:
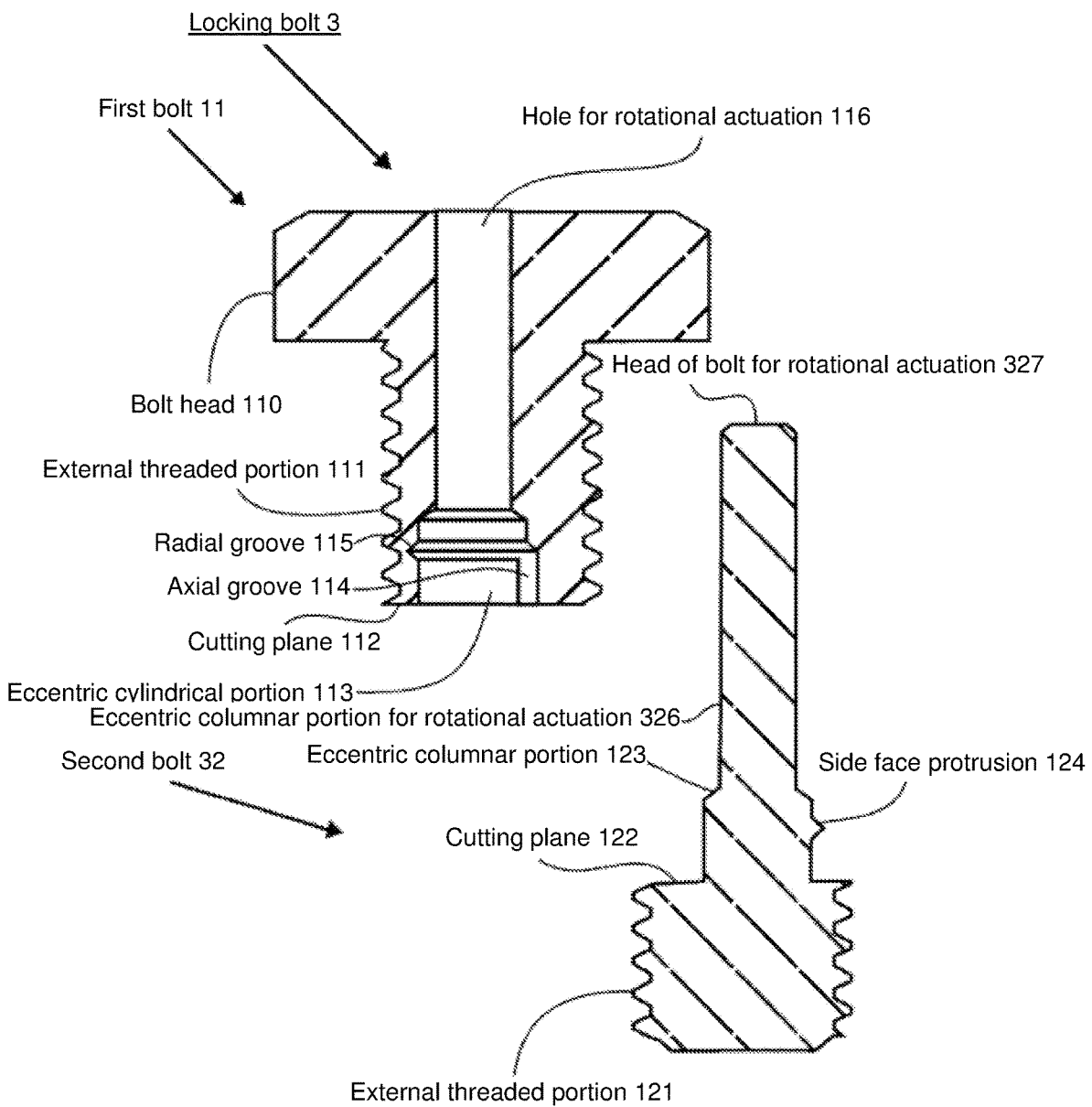
FIG. 10 Sectional view of locking bolt in which the locking bolt of FIG. 1 is provided with a rod that is integral to the recess permitting rotational actuation at the second bolt.
Figure 11:
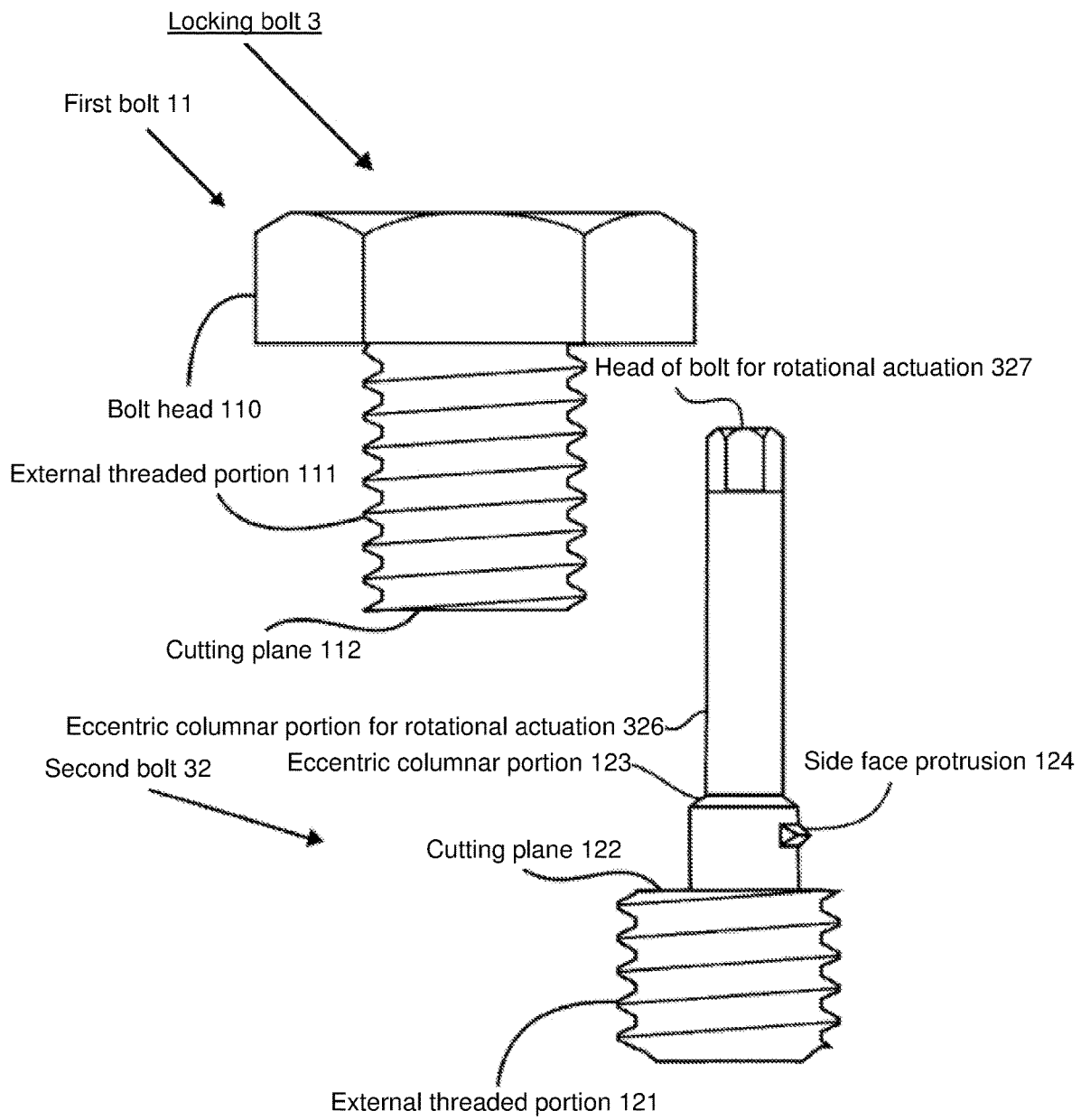
FIG. 11 Front view of locking bolt of FIG. 10.

As shown in FIG. 10 and FIG. 11, by providing eccentric columnar portion 326 for rotational actuation which is a rod that is integral to the recess permitting rotational actuation at eccentric columnar portion 123 provided at cutting plane 122 of second bolt 32, eccentric columnar portion 326 for rotational actuation is such that when eccentric columnar portion 123 is captured by eccentric cylindrical portion 113 until a state is reached in which cutting plane 112 and cutting plane 122 come in contact, this will make it possible to carry out rotational actuation of second bolt 32 from the exterior inasmuch as it can be made to emerge to the exterior of first bolt 11 as a result of being made to pass through hole 116 for rotational actuation which extends all the way through first bolt 11, making it possible for the tightening procedure and locking procedure to be carried out with respect to locking bolt 3 using only two sizes of spanner/wrench, as a result of which it will be possible to obtain antiloosening effect in a manner that is easy and rapid as well as robust and reliable.

Working Example 4

Figure 12:
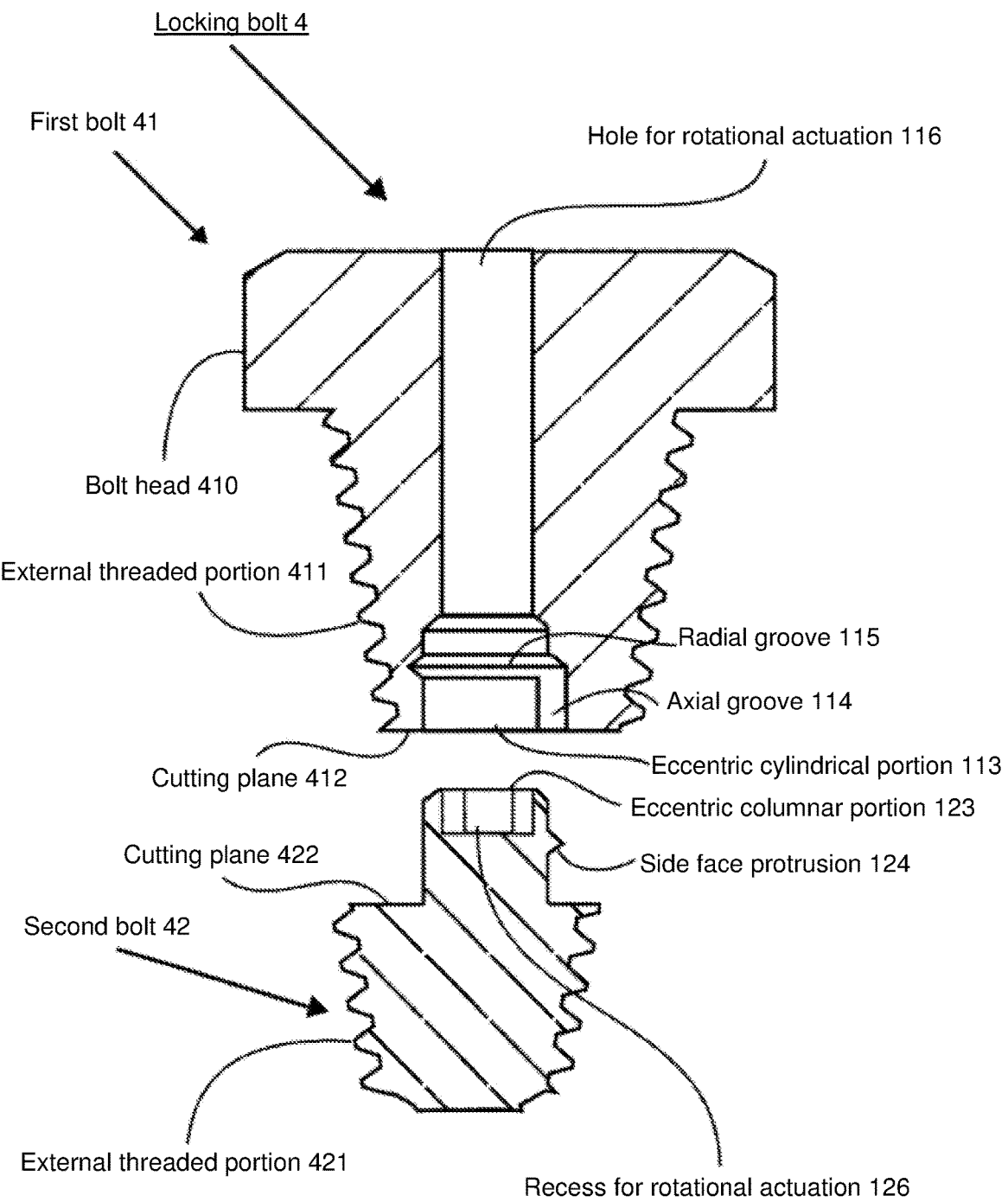
FIG. 12 Sectional view of locking bolt in which the locking bolt of FIG. 1 is such that the external threads of the first bolt and the external threads of the second bolt comprise tapered threads.

As shown in FIG. 12, where external threaded portion 411 of first bolt 41 and external threaded portion 421 of second bolt 42 are in the form of tapered threads, it will also be possible to obtain antiloosening effect in a manner that is easy and rapid as well as robust and reliable.

Working Example 5

Figure 13:
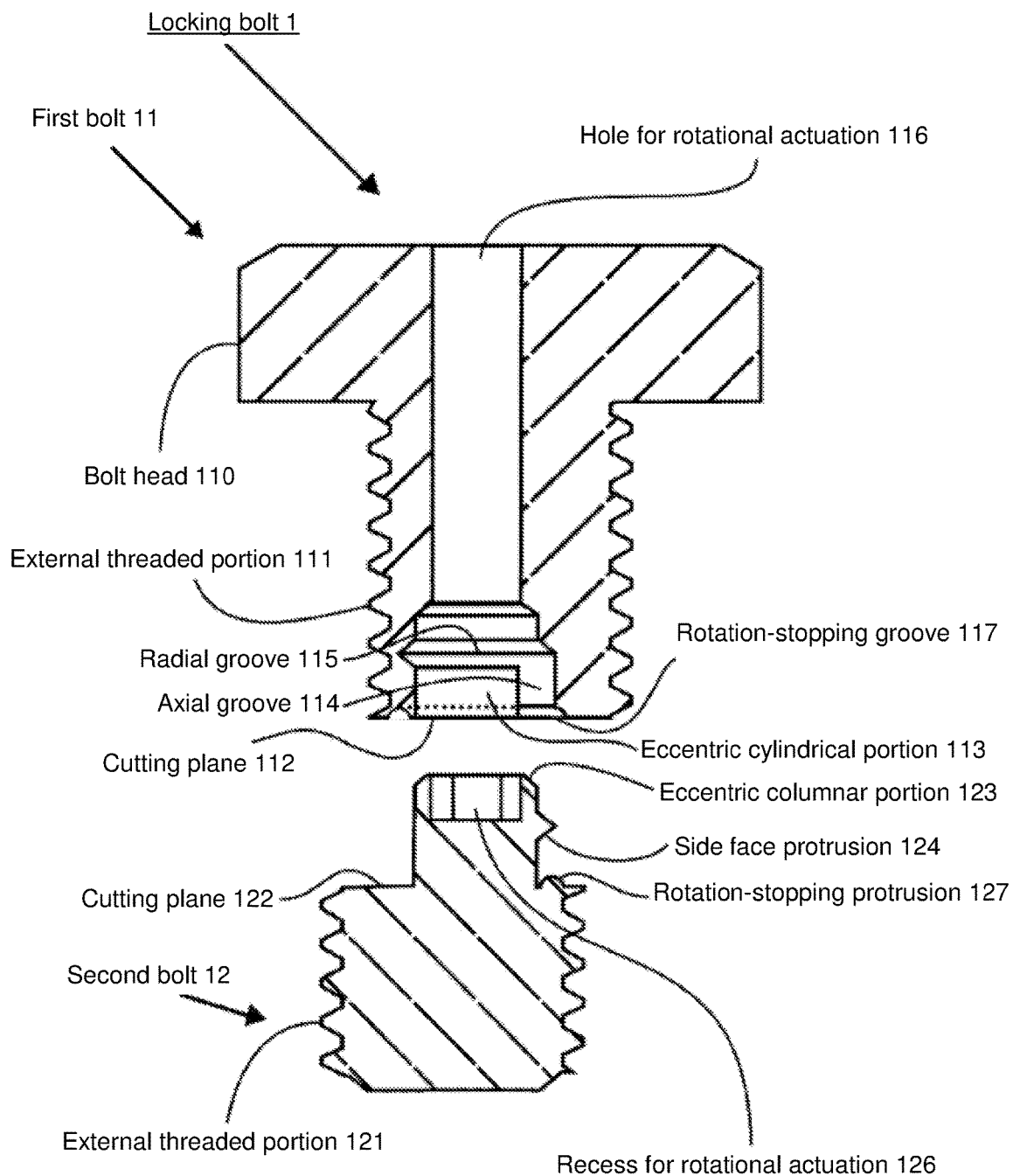
FIG. 13 Sectional view of locking bolt in which the locking bolt of FIG. 1 is equipped with rotation-stopping feature(s) at the cutting plane.

As shown in FIG. 13, by providing rotation-stopping groove 117 and rotation-stopping protrusion 127 at mutually opposed cutting plane 112 and cutting plane 122 of first bolt 11 and second bolt 12, when a force is applied to bolt head 110 of first bolt 11 to cause rotation in a direction such as will cause tightening as shown in FIG. 6, due to the fact that rotation-stopping protrusion 127 catches on the end of rotation-stopping groove 117, it will be possible even where the radial groove at first bolt 11 does not have an end to cause second bolt 12 to move in such fashion as to follow the motion of first bolt 11.

Working Example 6

Figure 14:
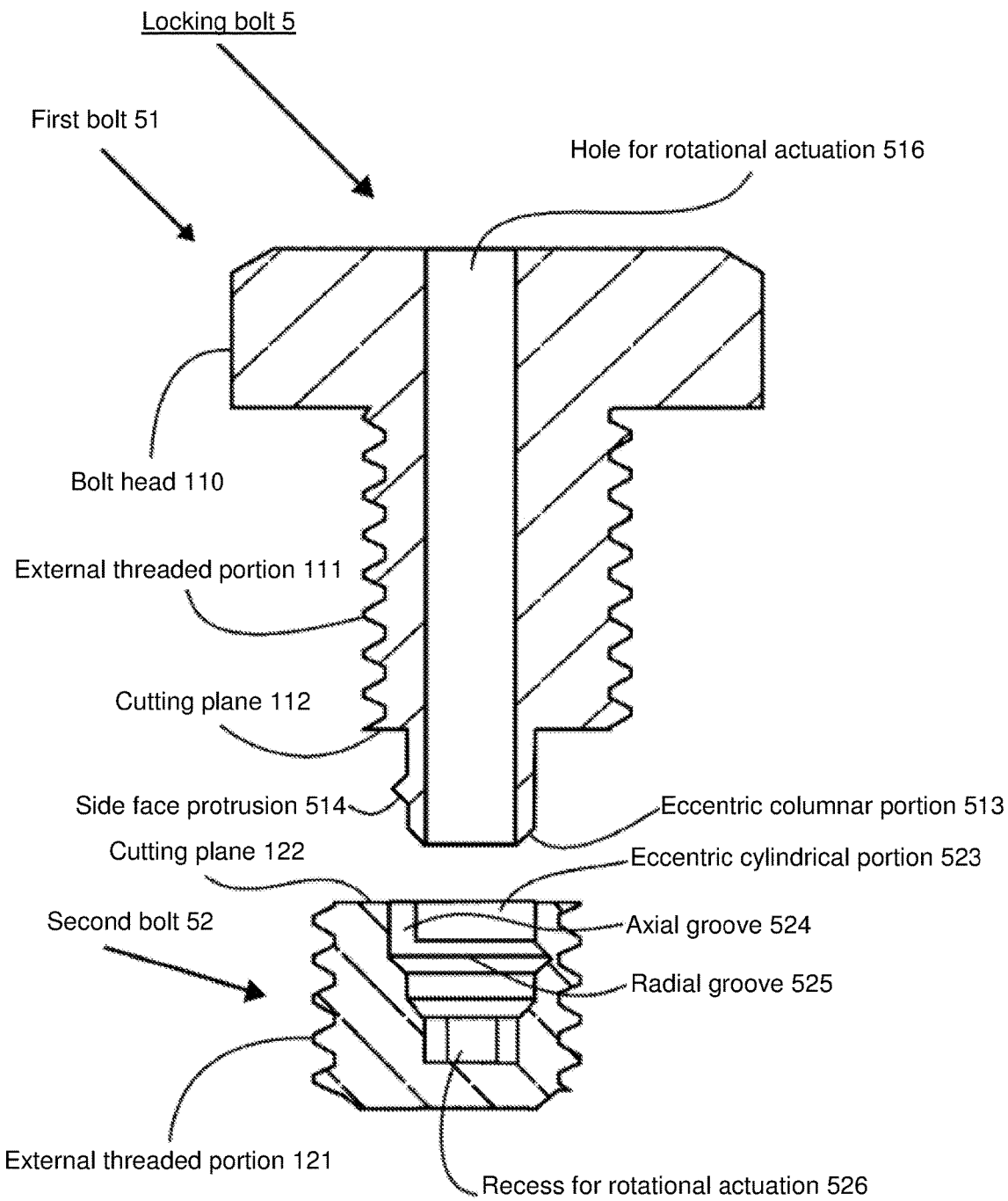
FIG. 14 Sectional view of a locking bolt in which an eccentric columnar portion is provided instead of an eccentric cylindrical portion at a first bolt, an eccentric cylindrical portion is provided instead of an eccentric columnar portion at a second bolt, and a recess for rotational actuation is provided at the bottom of the eccentric cylindrical portion of the second bolt.
Figure 15:
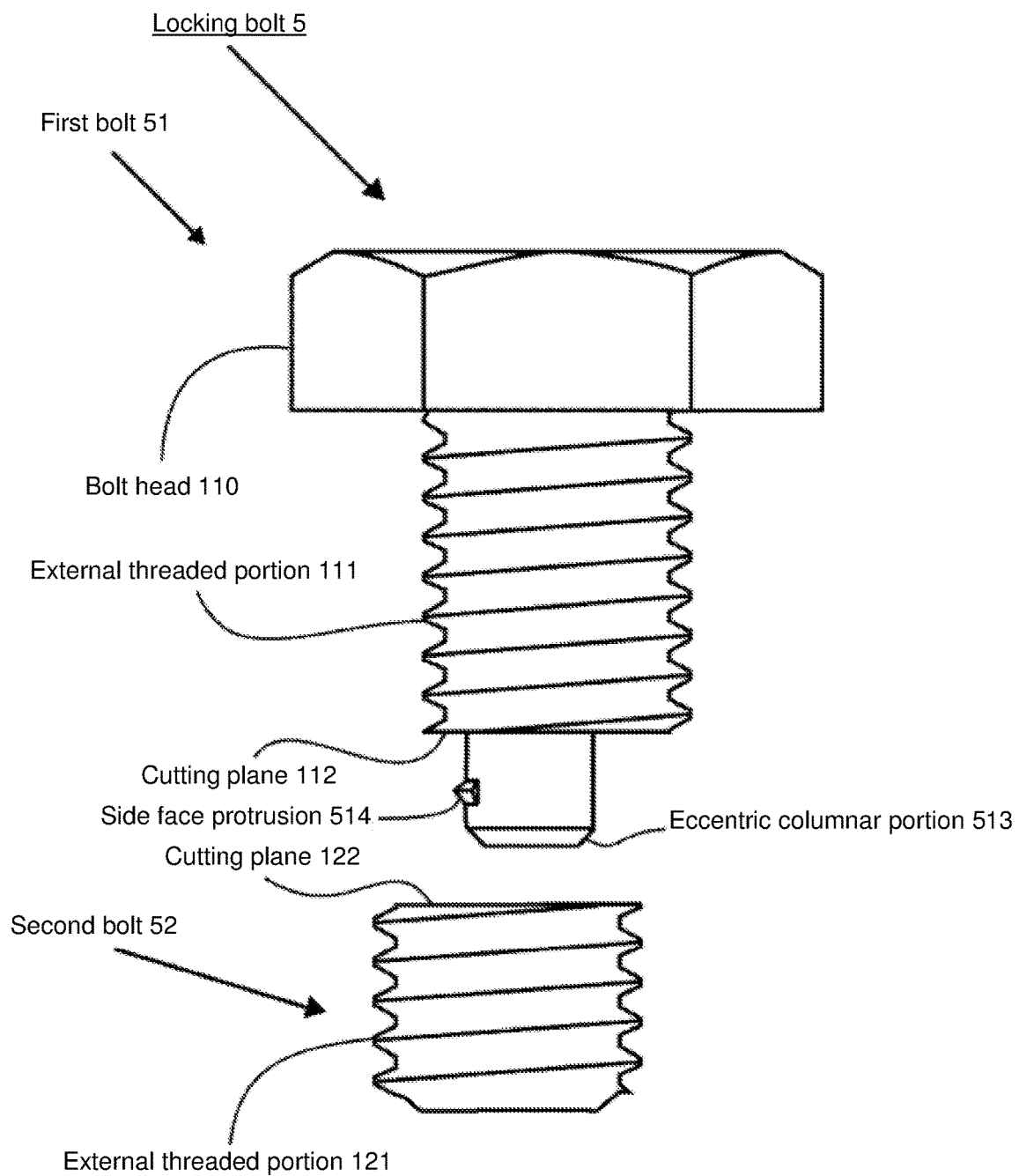
FIG. 15 Front view of the locking bolt of FIG. 14.
Figure 16:
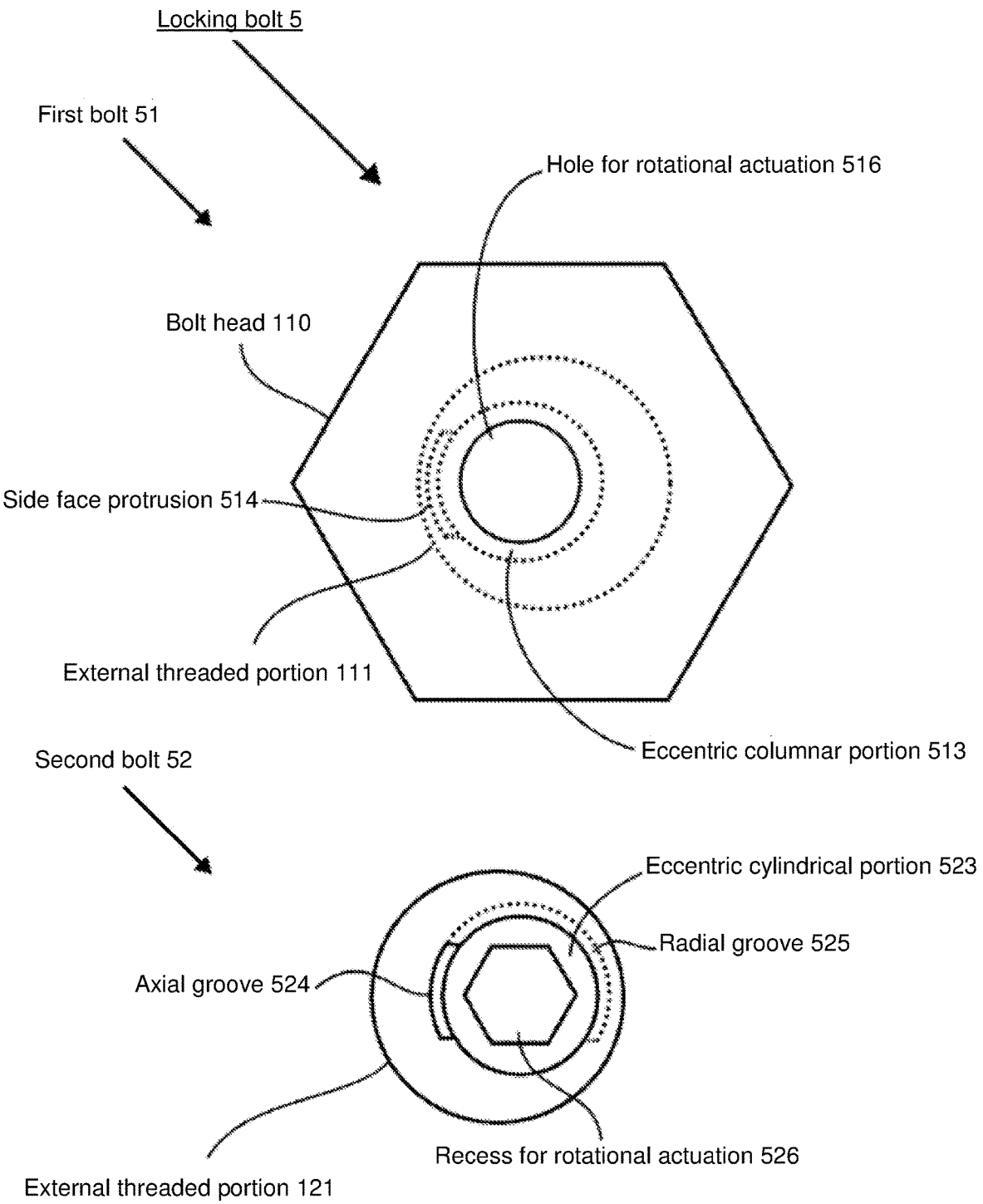
FIG. 16 Top view of the locking bolt of FIG. 14.

As shown in FIG. 14, FIG. 15, and FIG. 16, by providing eccentric columnar portion 513 instead of eccentric cylindrical portion 113 at cutting plane 112 of first bolt 51, and by forming a hole which will serve as eccentric cylindrical portion 523 and by providing recess 526 for rotational actuation at the bottom of eccentric cylindrical portion 523 instead of eccentric columnar portion 123 at cutting plane 122 of second bolt 52, it will also be possible achieve operation and function similar to those of locking bolt 1 indicated at Working Example 1, and it will be possible to obtain antiloosening effect in a manner that is easy and rapid as well as robust and reliable.

Working Example 7

Figure 17:
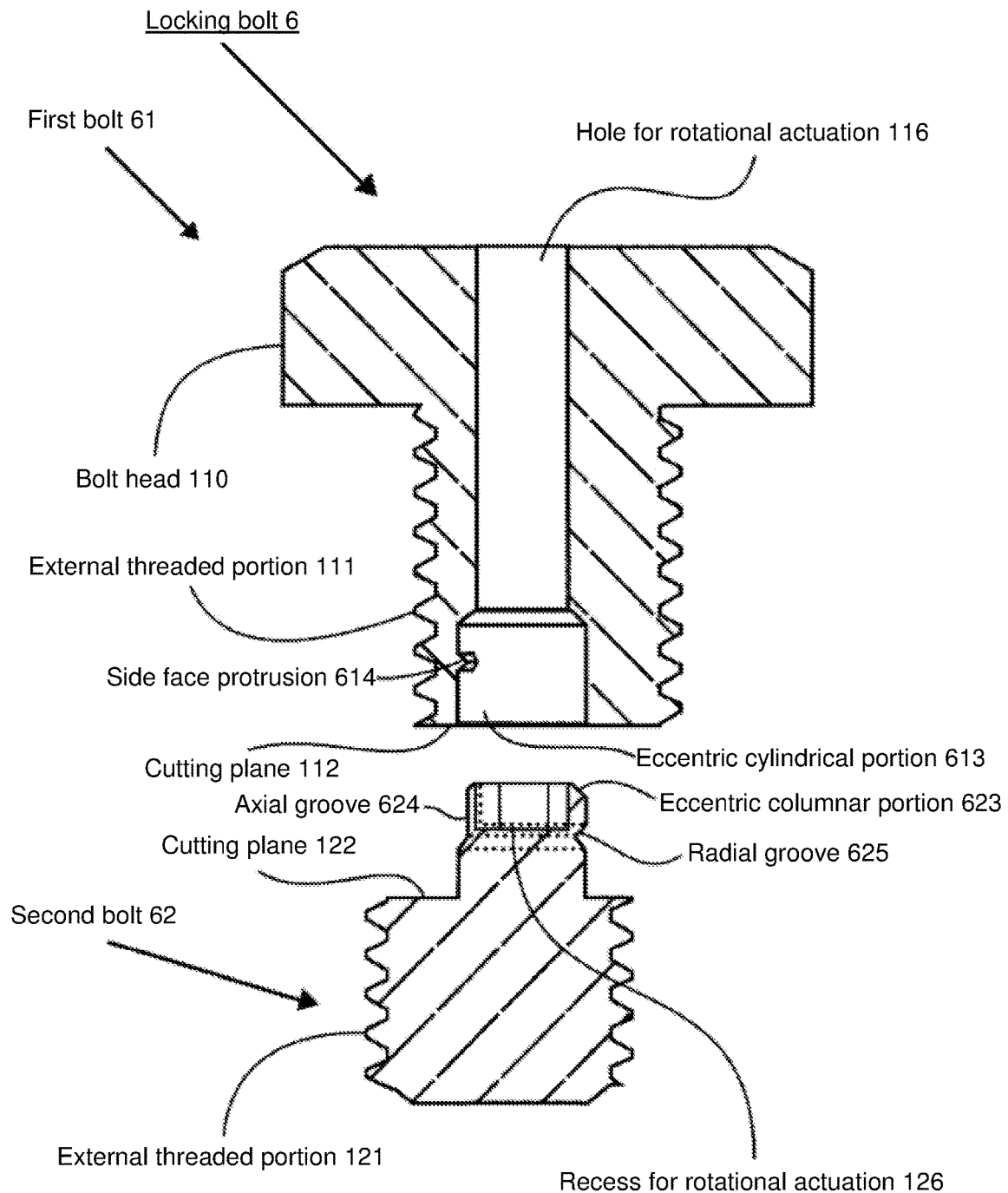
FIG. 17 Sectional view of a locking bolt in which, at the locking bolt of FIG. 1, a side face protrusion is provided instead of a radial groove and an axial groove at an eccentric cylindrical portion of a first bolt, and a radial groove and an axial groove are provided instead of a side face protrusion at an eccentric columnar portion of a second bolt.
Figure 18:
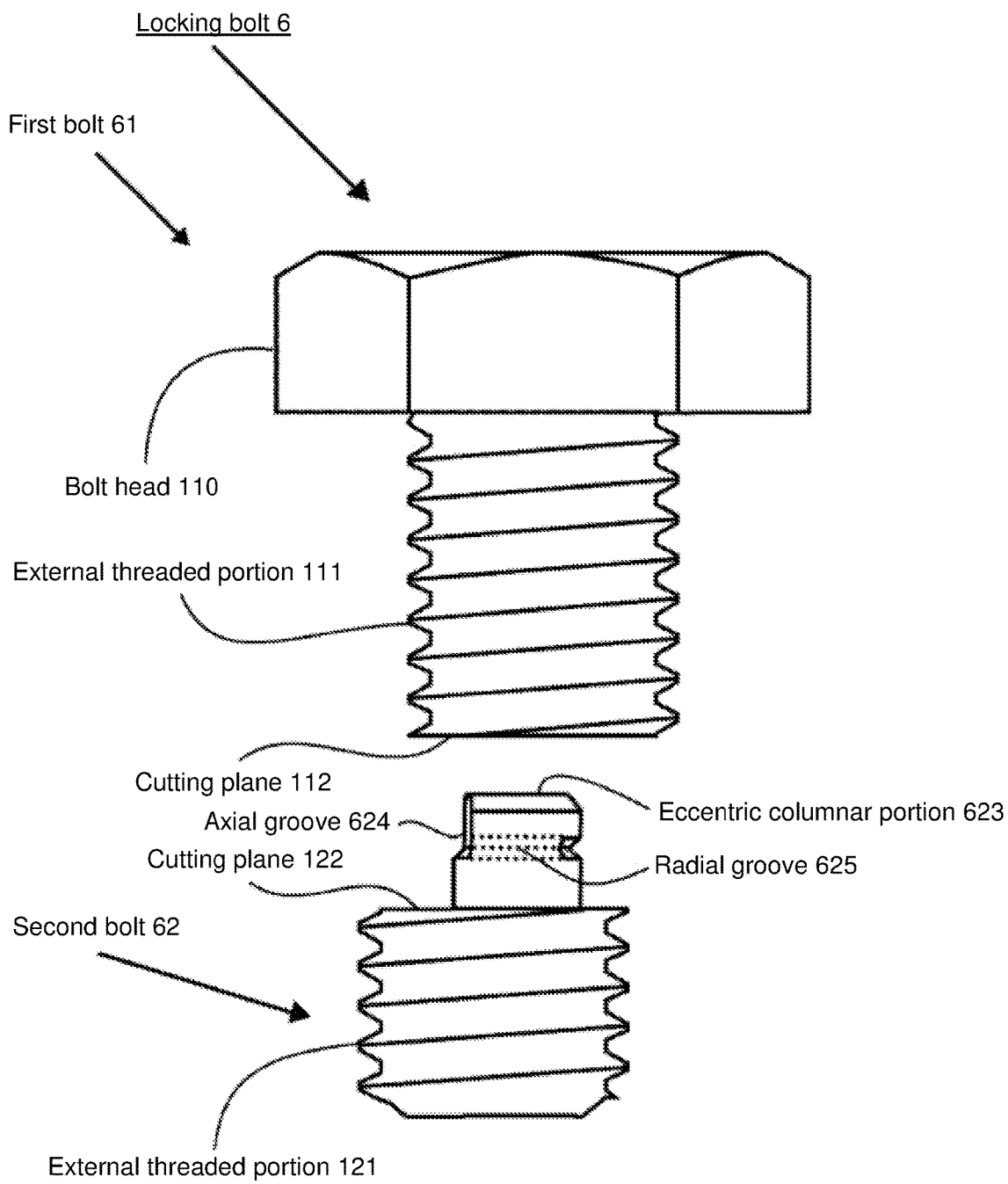
FIG. 18 Front view of the locking bolt of FIG. 17.
Figure 19:
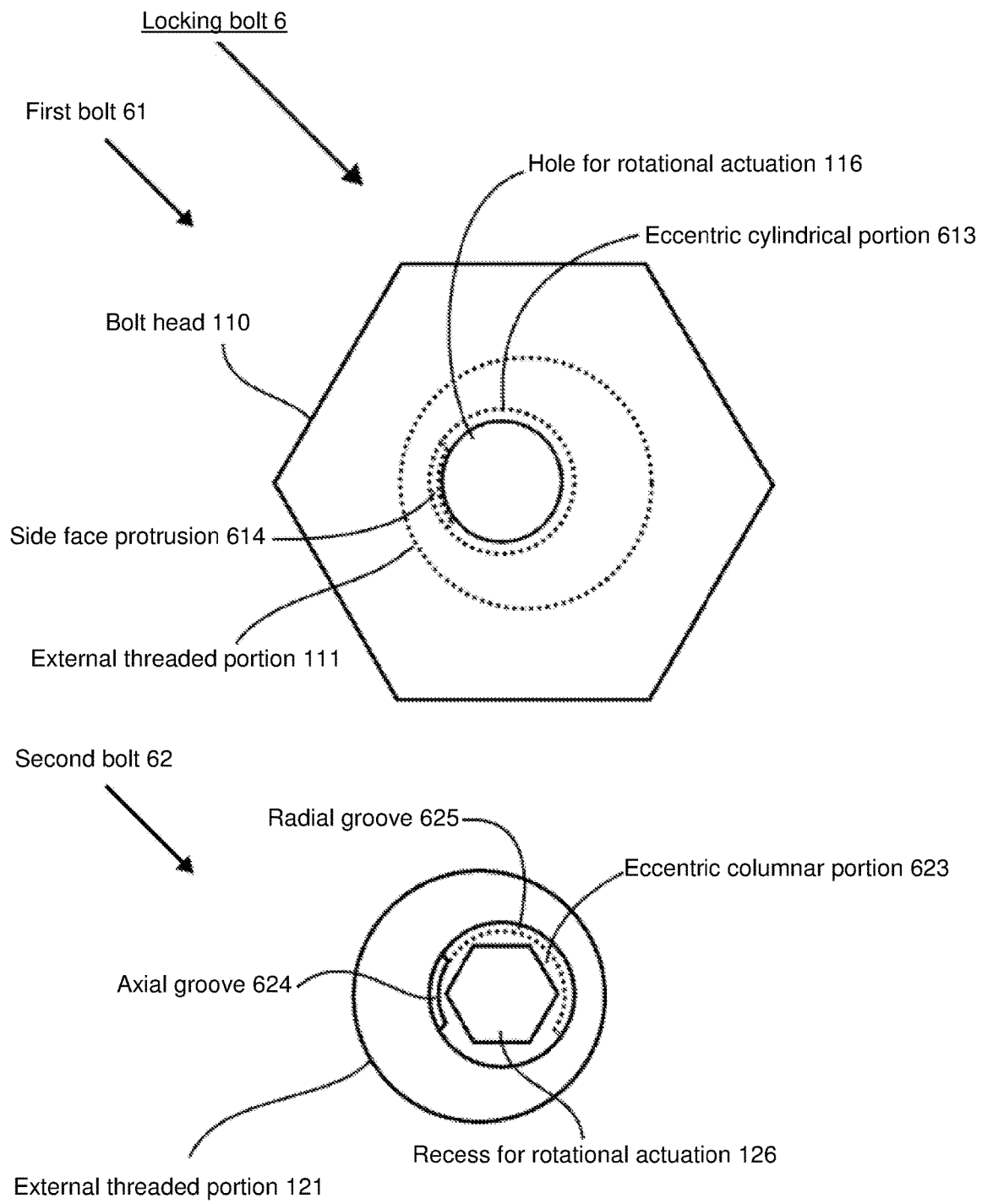
FIG. 19 Top view of the locking bolt of FIG. 17.

As shown in FIG. 17, FIG. 18, and FIG. 19, by providing side face protrusion 614 instead of axial groove 114 and radial groove 115 at eccentric cylindrical portion 613 of first bolt 61, and by providing axial groove 624 and radial groove 625 instead of side face protrusion 124 at eccentric columnar portion 623 of second bolt 62, it will also be possible achieve operation and function similar to those of locking bolt 1 indicated at Working Example 1, and it will be possible to obtain antiloosening effect in a manner that is easy and rapid as well as robust and reliable.

Working Example 8

Figure 20:
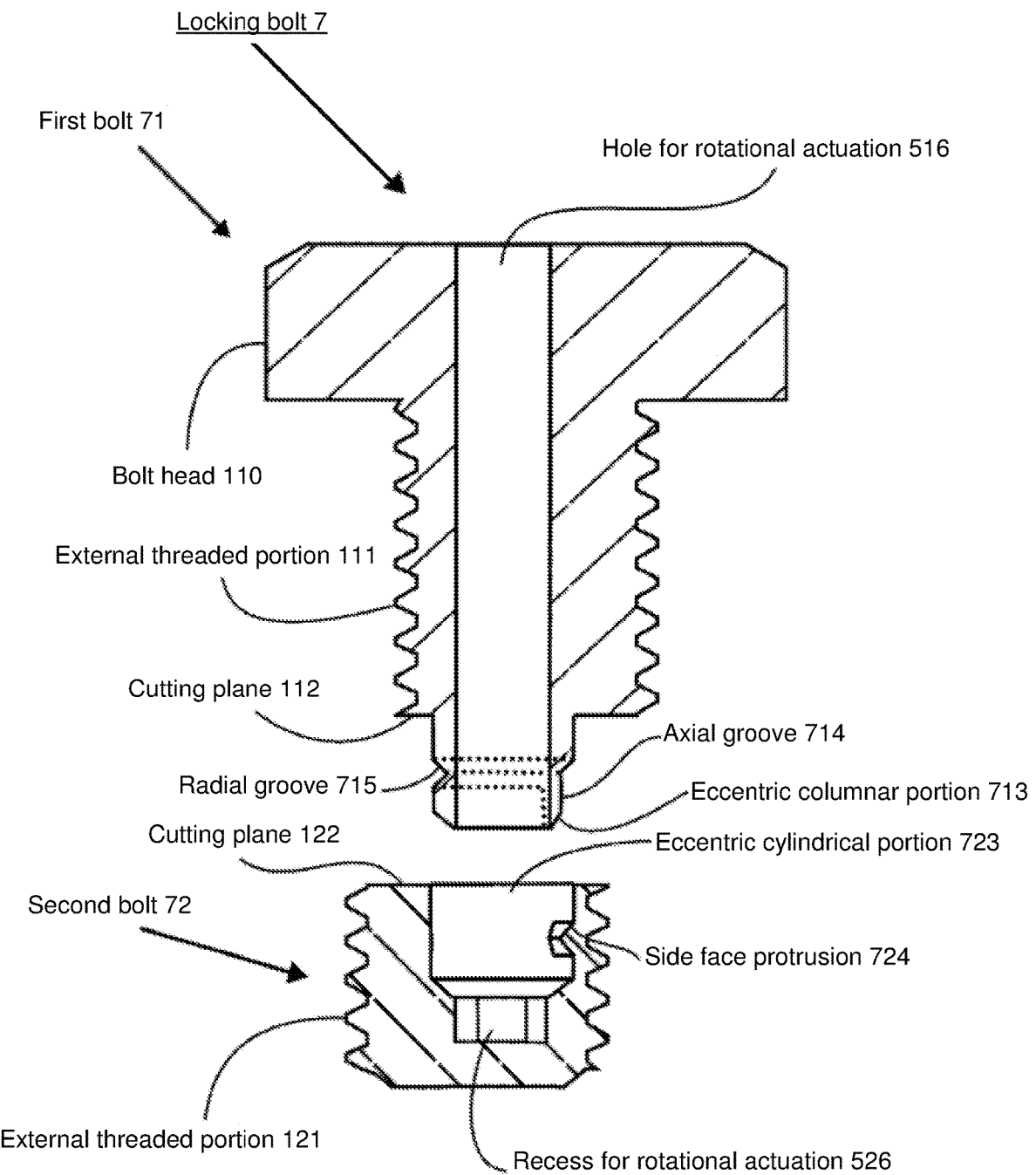
FIG. 20 Sectional view of a locking bolt in which, at the locking bolt of FIG. 14, a radial groove and an axial groove are provided instead of a side face protrusion at an eccentric columnar portion of a first bolt, and a side face protrusion is provided instead of a radial groove and an axial groove at an eccentric cylindrical portion of a second bolt.
Figure 21:
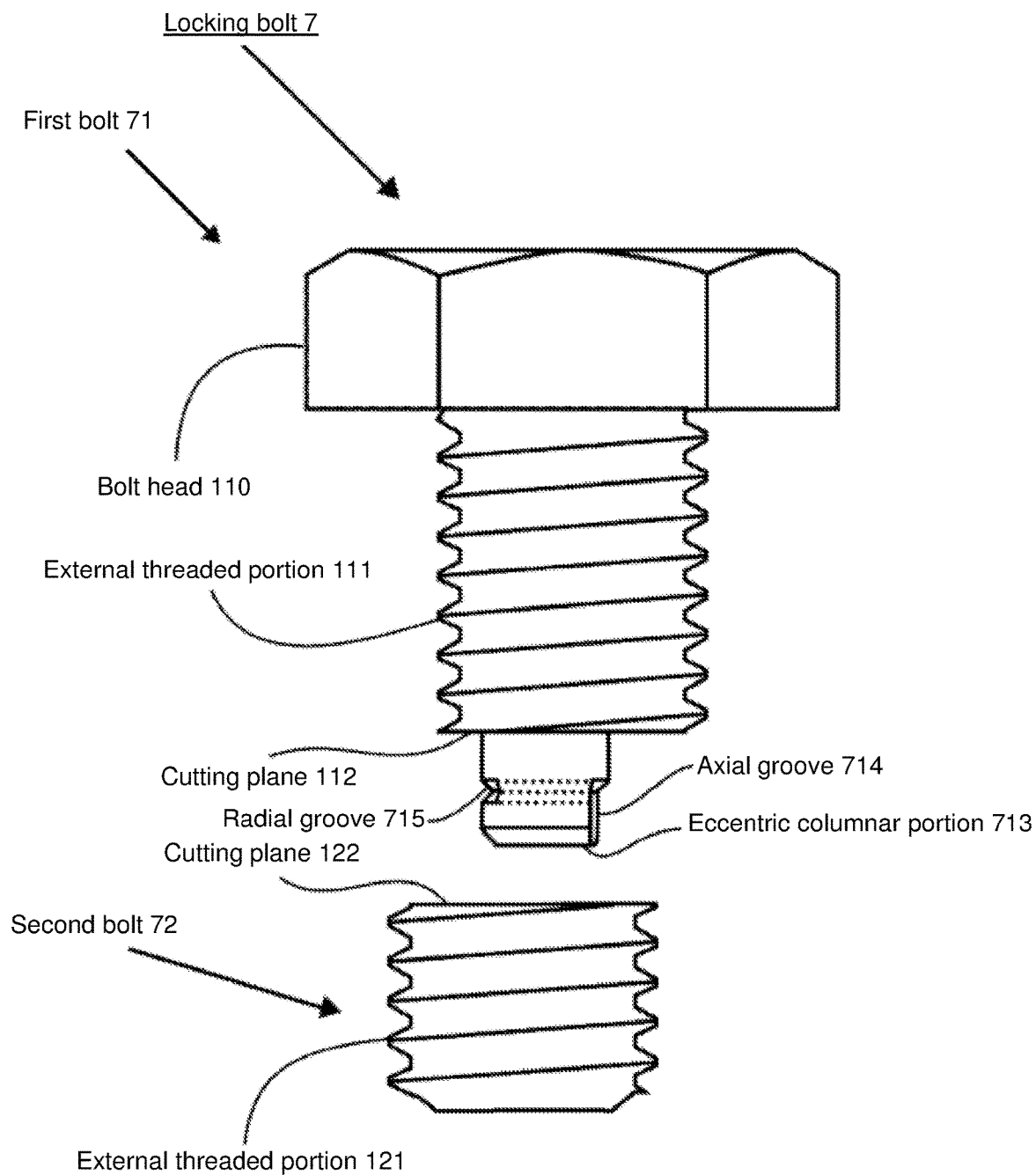
FIG. 21 Front view of locking bolt of FIG. 20.
Figure 22:
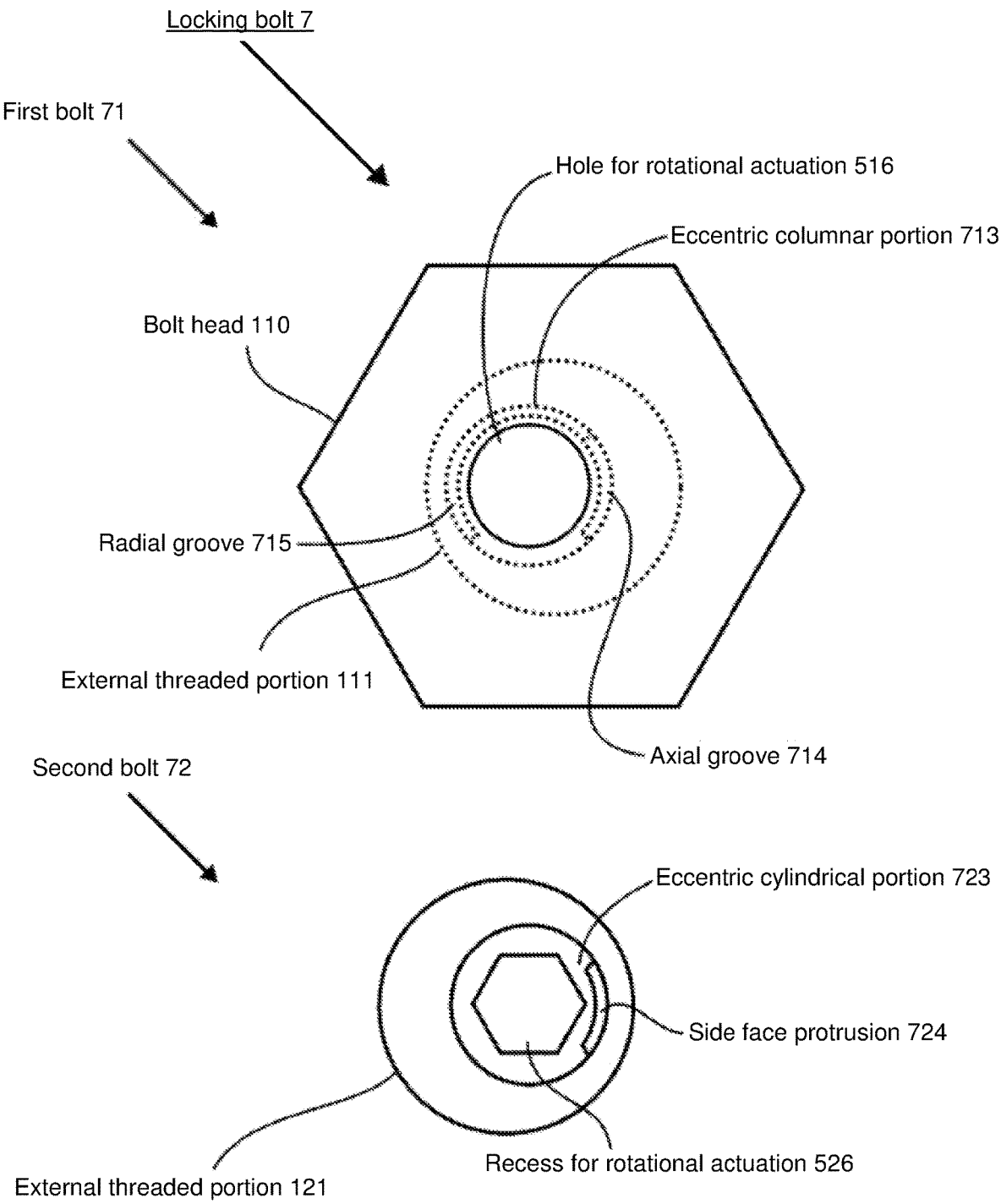
FIG. 22 Top view of locking bolt of FIG. 20.

As shown in FIG. 20, FIG. 21, and FIG. 22, by providing side face protrusion 724 instead of axial groove 524 and radial groove 525 at eccentric cylindrical portion 723 of second bolt 72, and by providing axial groove 714 and radial groove 715 instead of side face protrusion 514 at eccentric columnar portion 713 of first bolt 71, it will also be possible achieve operation and function similar to those of locking bolt 5 indicated at Working Example 6, and it will be possible to obtain antiloosening effect in a manner that is easy and rapid as well as robust and reliable.

Working Example 9

Figure 23:
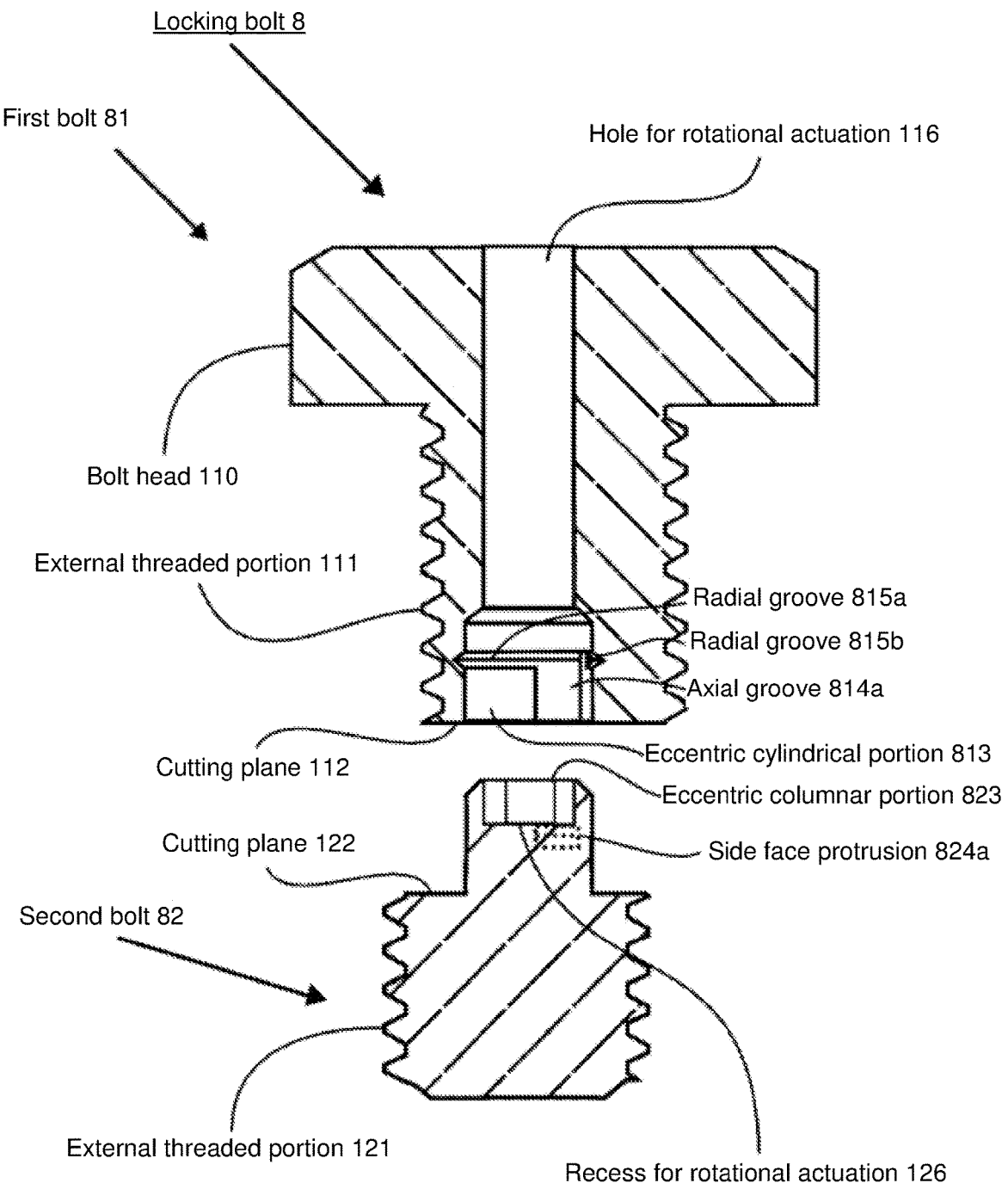
FIG. 23 Sectional view of locking bolt in which, at the locking bolt of FIG. 1, two axial grooves and two radial grooves are provided at an eccentric cylindrical portion of a first bolt, and two side face protrusions are provided at an eccentric columnar portion of a second bolt.
Figure 24:
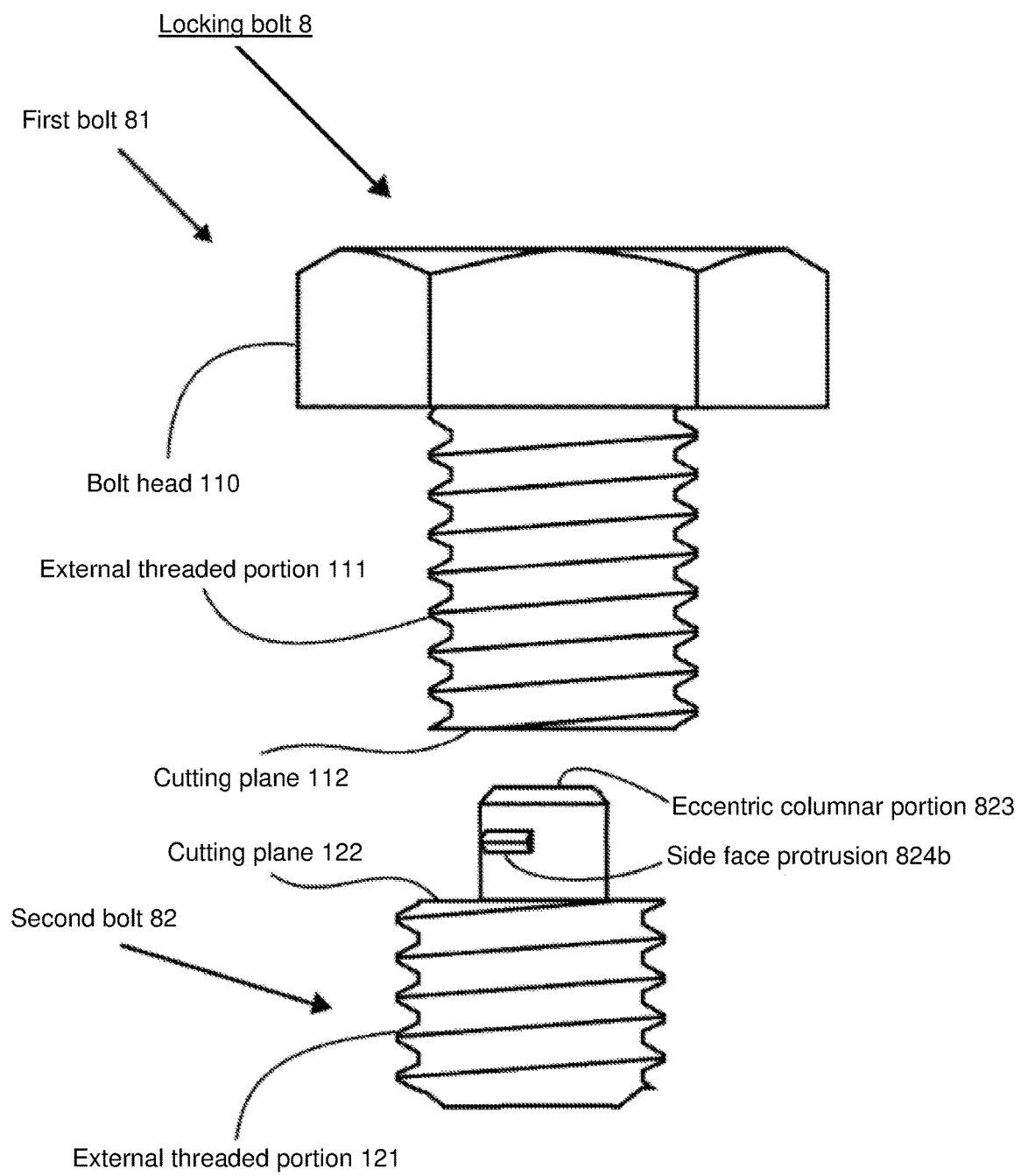
FIG. 24 Front view of locking bolt of FIG. 23.
Figure 25:
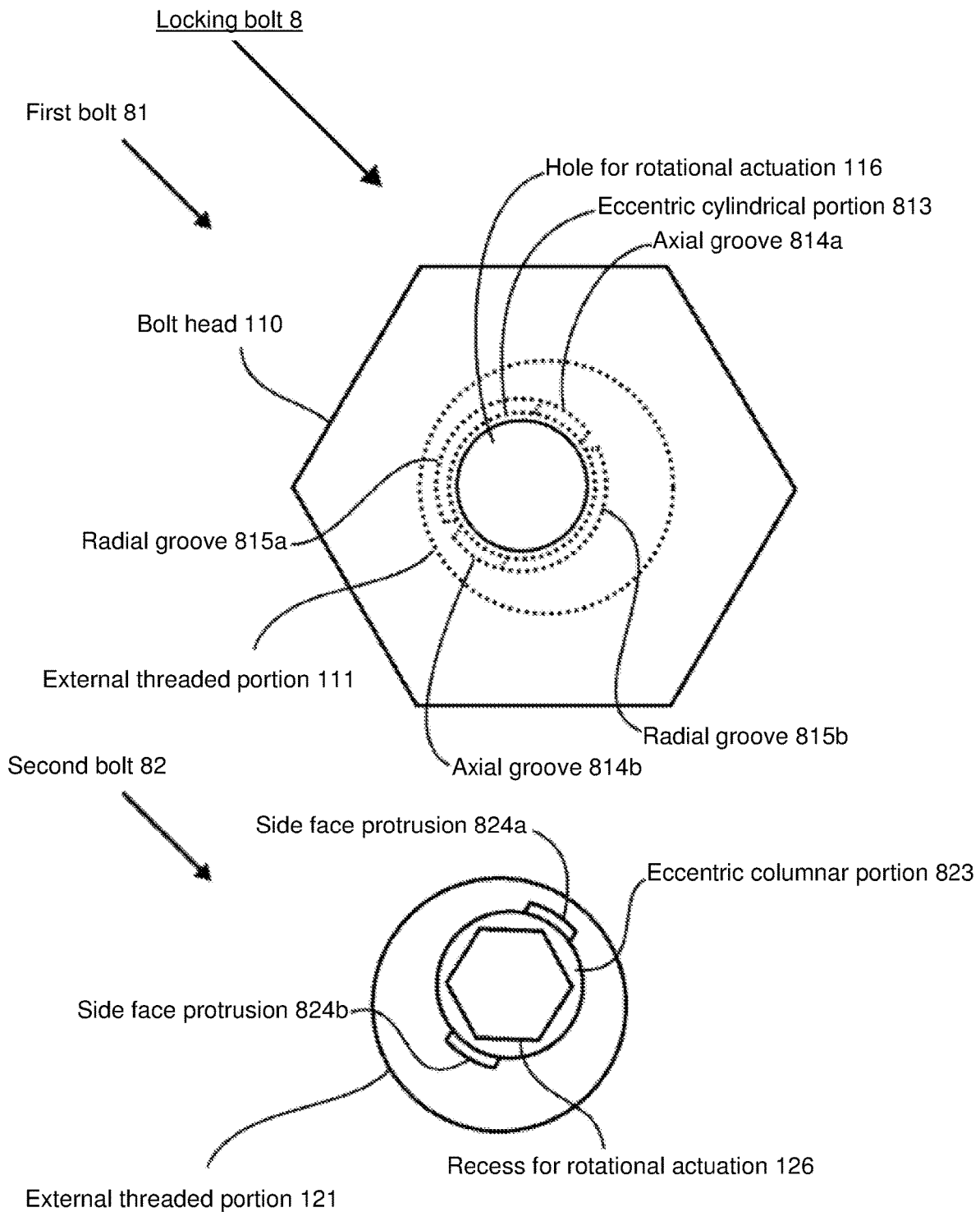
FIG. 25 Top view of locking bolt of FIG. 23.

As shown in FIG. 23, FIG. 24, and FIG. 25, by providing axial groove 814a and axial groove 814b and radial groove 815a and radial groove 815b at eccentric cylindrical portion 813 of first bolt 81, and by providing side face protrusion 824a and side face protrusion 824b at eccentric columnar portion 823 of second bolt 82, it will also be possible achieve operation and function similar to those of locking bolt 1 indicated at Working Example 1, and it will be possible to obtain antiloosening effect in a manner that is easy and rapid as well as robust and reliable.

Working Example 10

Figure 26:
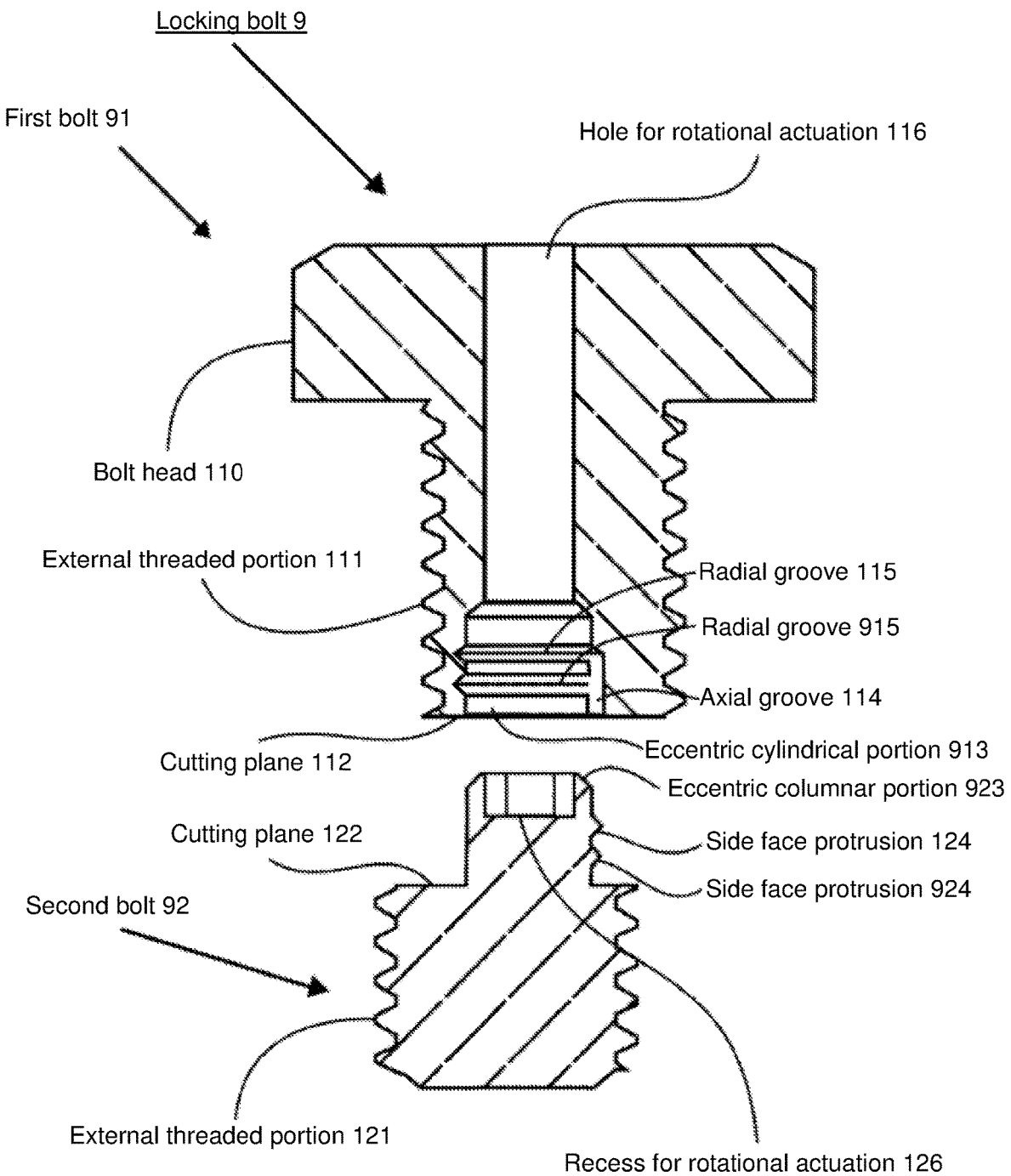
FIG. 26 Sectional view of locking bolt in which, at the locking bolt of FIG. 1, two radial grooves are provided at an eccentric cylindrical portion of a first bolt, and two side face protrusions are provided at an eccentric columnar portion of a second bolt.
Figure 27:
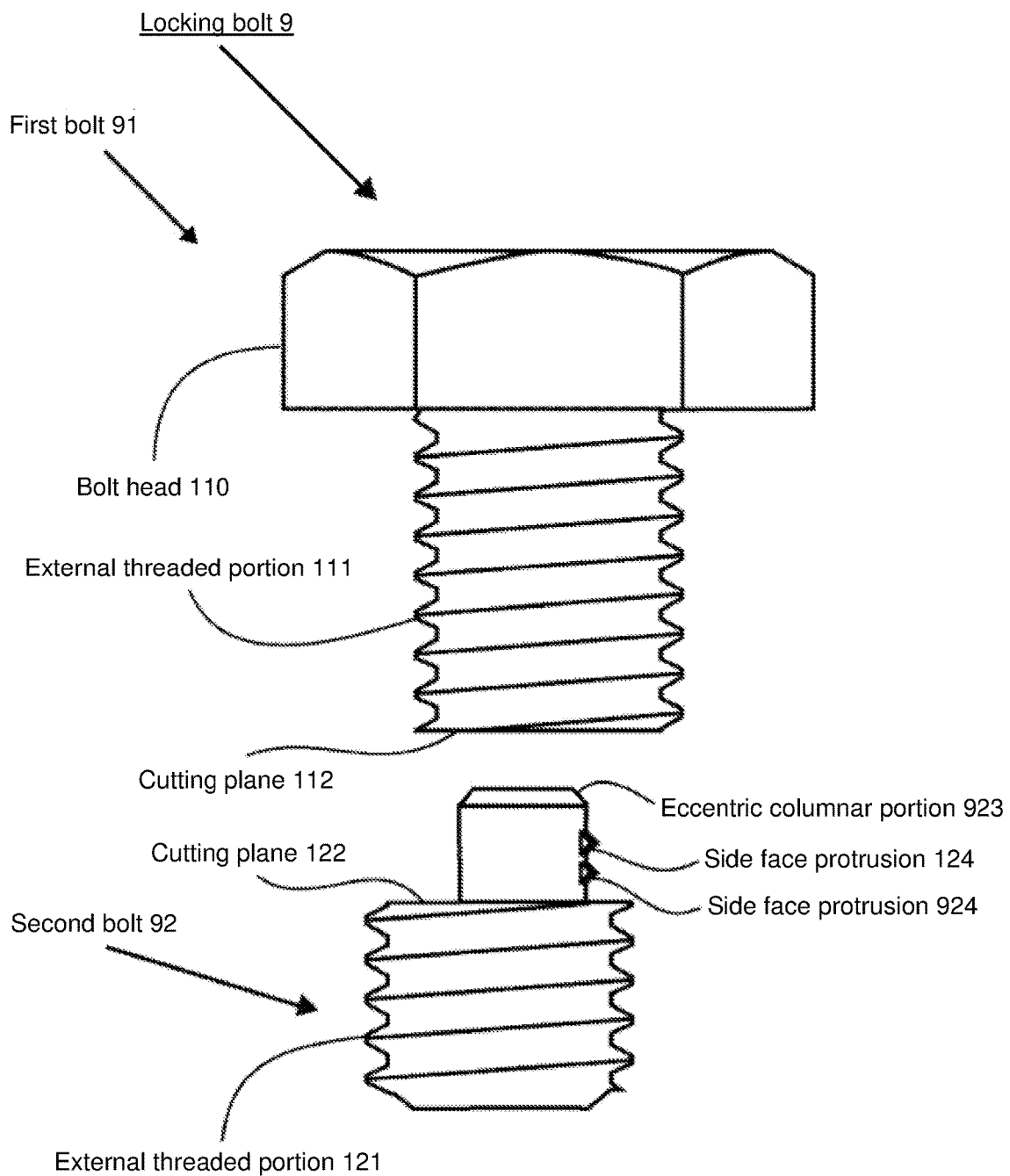
FIG. 27 Front view of locking bolt of FIG. 26.

As shown in FIG. 26 and FIG. 27, by providing axial groove 114 and radial groove 115 and radial groove 915 at eccentric cylindrical portion 913 of first bolt 91, and by providing side face protrusion 124 and side face protrusion 924 at eccentric columnar portion 923 of second bolt 92, it will also be possible achieve operation and function similar to those of locking bolt 1 indicated at Working Example 1, and it will be possible to obtain antiloosening effect in a manner that is easy and rapid as well as robust and reliable.

Working Example 11

Figure 28:
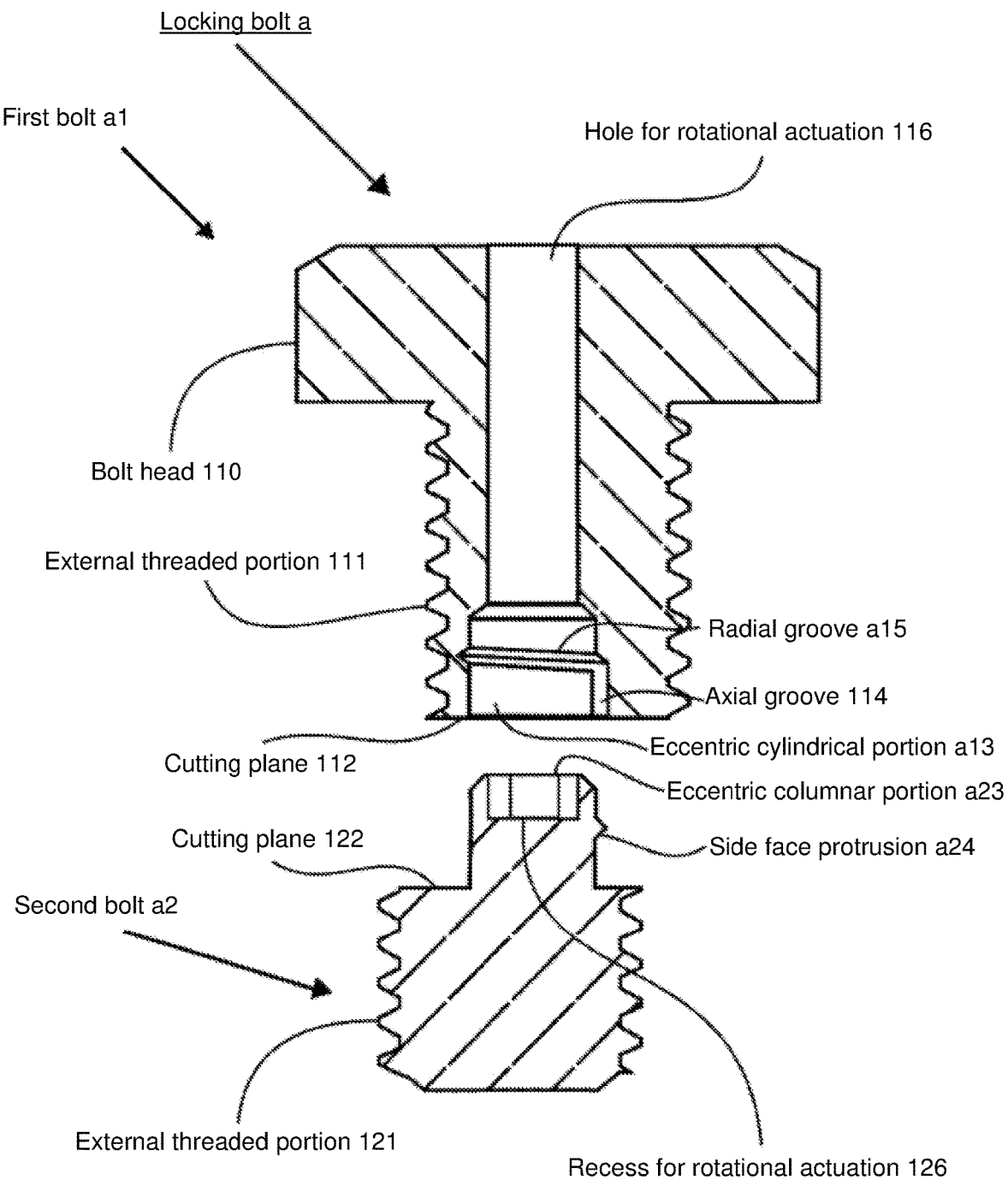
FIG. 28 Sectional view of a locking bolt in which, at the locking bolt of FIG. 1, a groove which is diagonally inclined with respect to the radial direction is provided at an eccentric cylindrical portion of a first bolt, and a side face protrusion which engages with the diagonally inclined groove is provided at an eccentric columnar portion of a second bolt.
Figure 29:
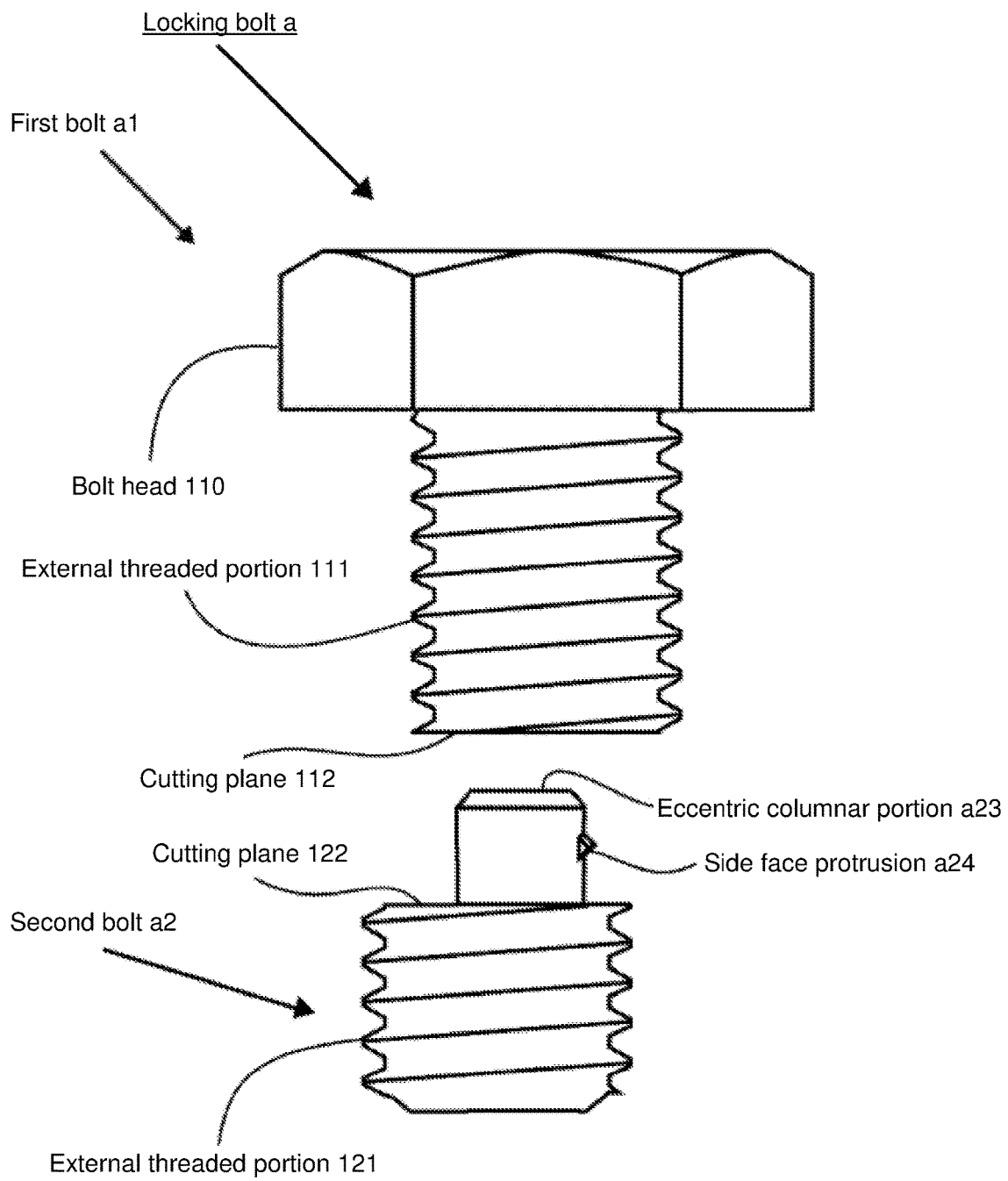
FIG. 29 Front view of locking bolt of FIG. 28.
Figure 30:
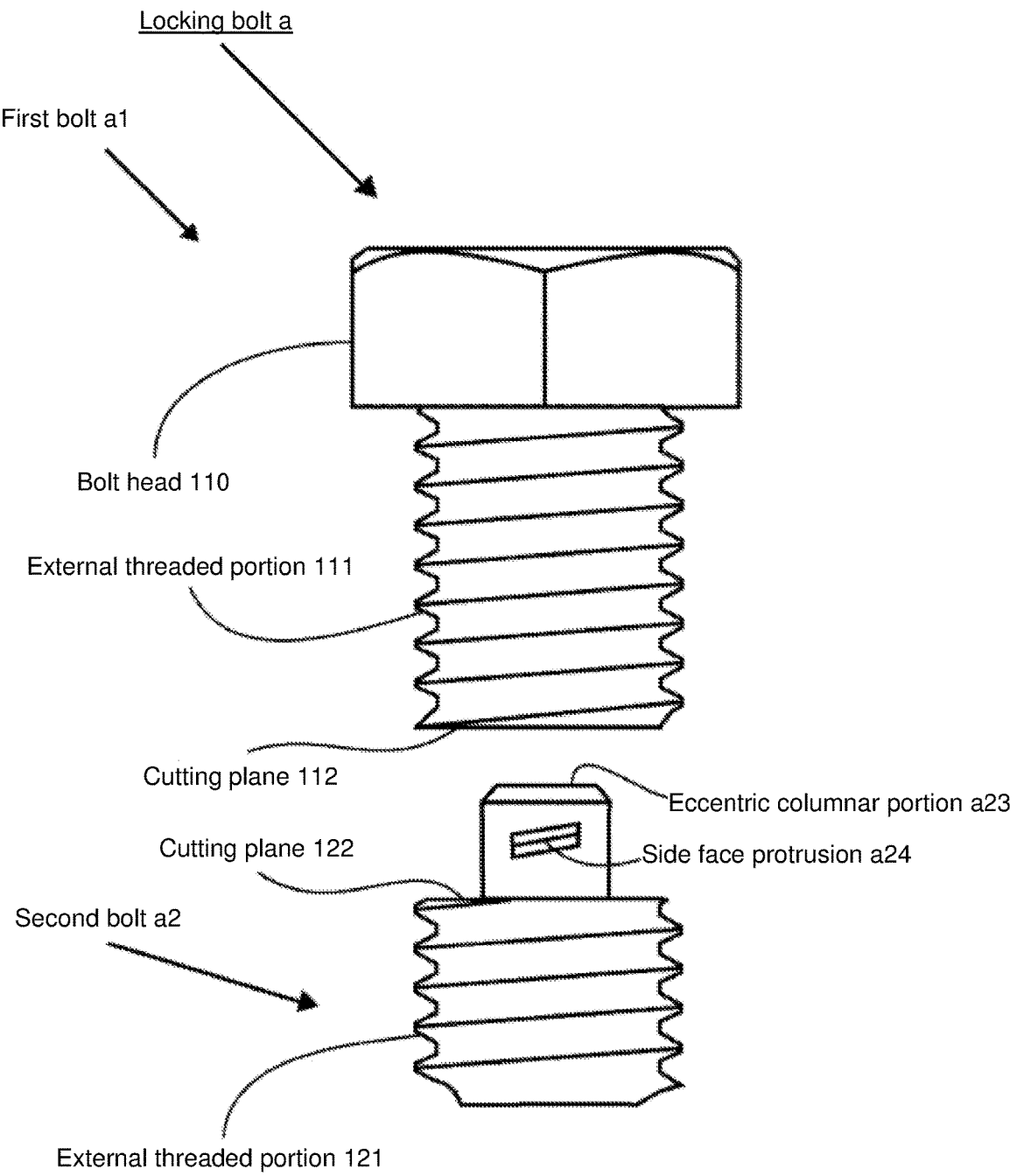
FIG. 30 Right side view of locking bolt of FIG. 28.

As shown in FIG. 28, FIG. 29, and FIG. 30, by providing axial groove 114 and radial groove a15 which is diagonally inclined with respect to the radial direction at eccentric cylindrical portion a13 of first bolt a1, and by providing side face protrusion a24 which engages with diagonally inclined radial groove a15 at eccentric columnar portion a23 of second bolt a2, it will also be possible achieve operation and function similar to those of locking bolt 1 indicated at Working Example 1, and it will be possible to obtain antiloosening effect in a manner that is easy and rapid as well as robust and reliable.

Working Example 12

Figure 31:
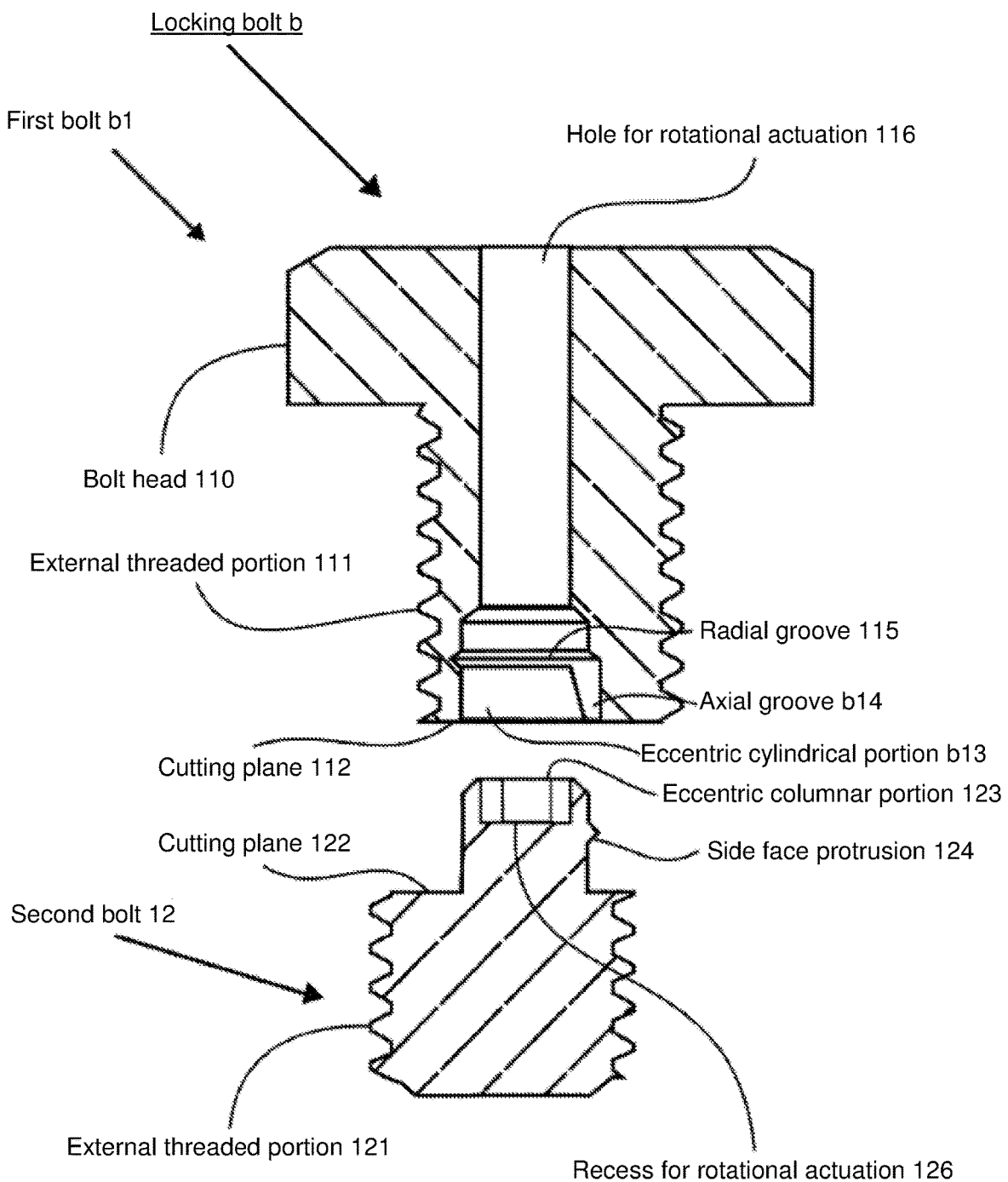
FIG. 31 Sectional view of locking bolt in which, at the locking bolt of FIG. 1, a groove which is diagonally inclined with respect to the axial direction is provided at an eccentric cylindrical portion of a first bolt.

As shown in FIG. 31, where axial groove b14 at eccentric cylindrical portion b13 of first bolt b1 is diagonally inclined with respect to the axial direction, it will also be possible achieve operation and function similar to those of locking bolt 1 indicated at Working Example 1, and it will be possible to obtain antiloosening effect in a manner that is easy and rapid as well as robust and reliable.

Working Example 13

Figure 32:
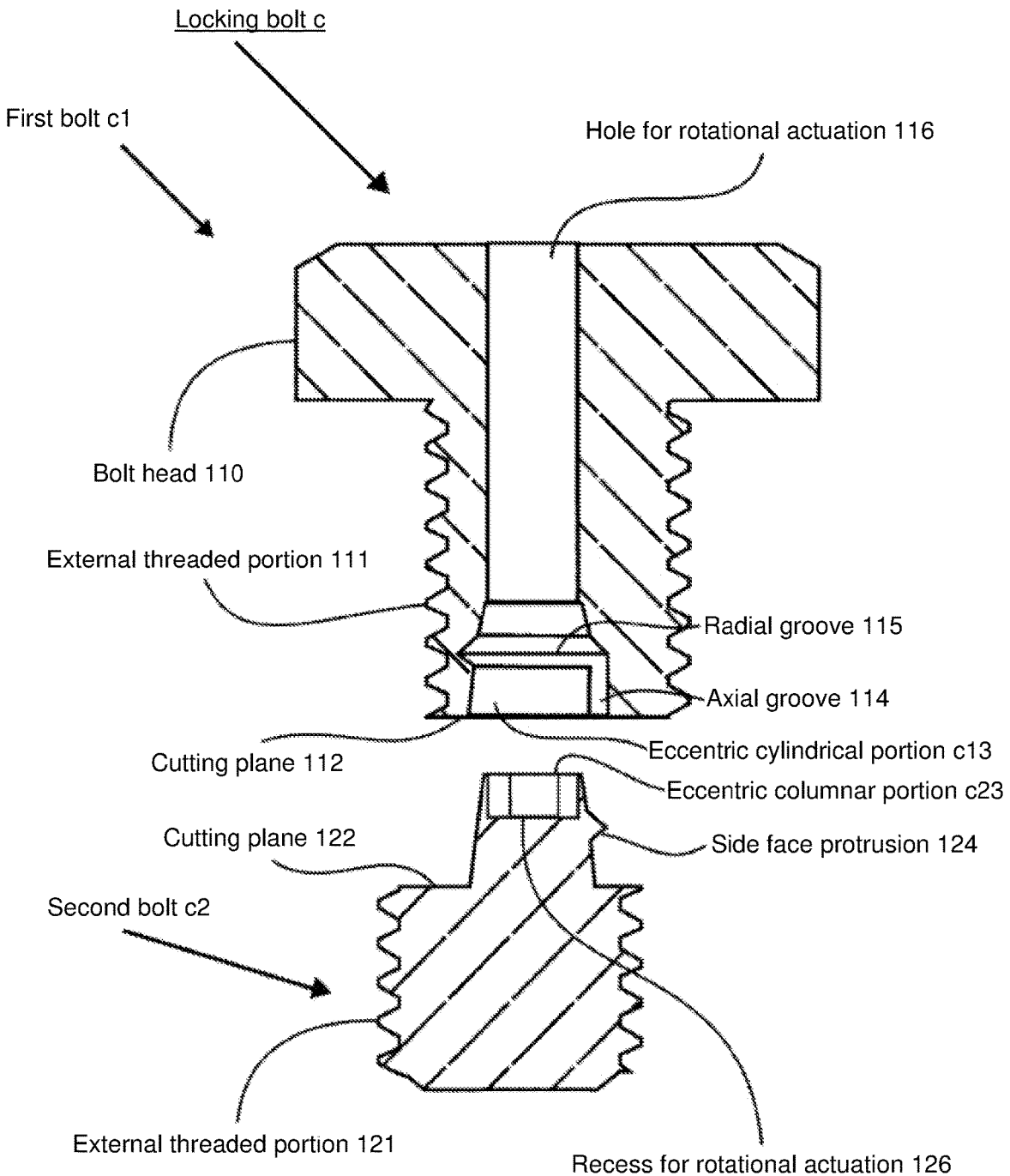
FIG. 32 Sectional view of locking bolt in which, at the locking bolt of FIG. 1, the shape of the hole at the eccentric cylindrical portion of the first bolt is made to be not columnar but frustoconical (the shape obtained when the top portion of a cone is cut by a plane parallel to the base and the pointed top portion is removed), and the eccentric columnar portion of the second bolt is made to be not columnar but frustoconical.
Figure 33:
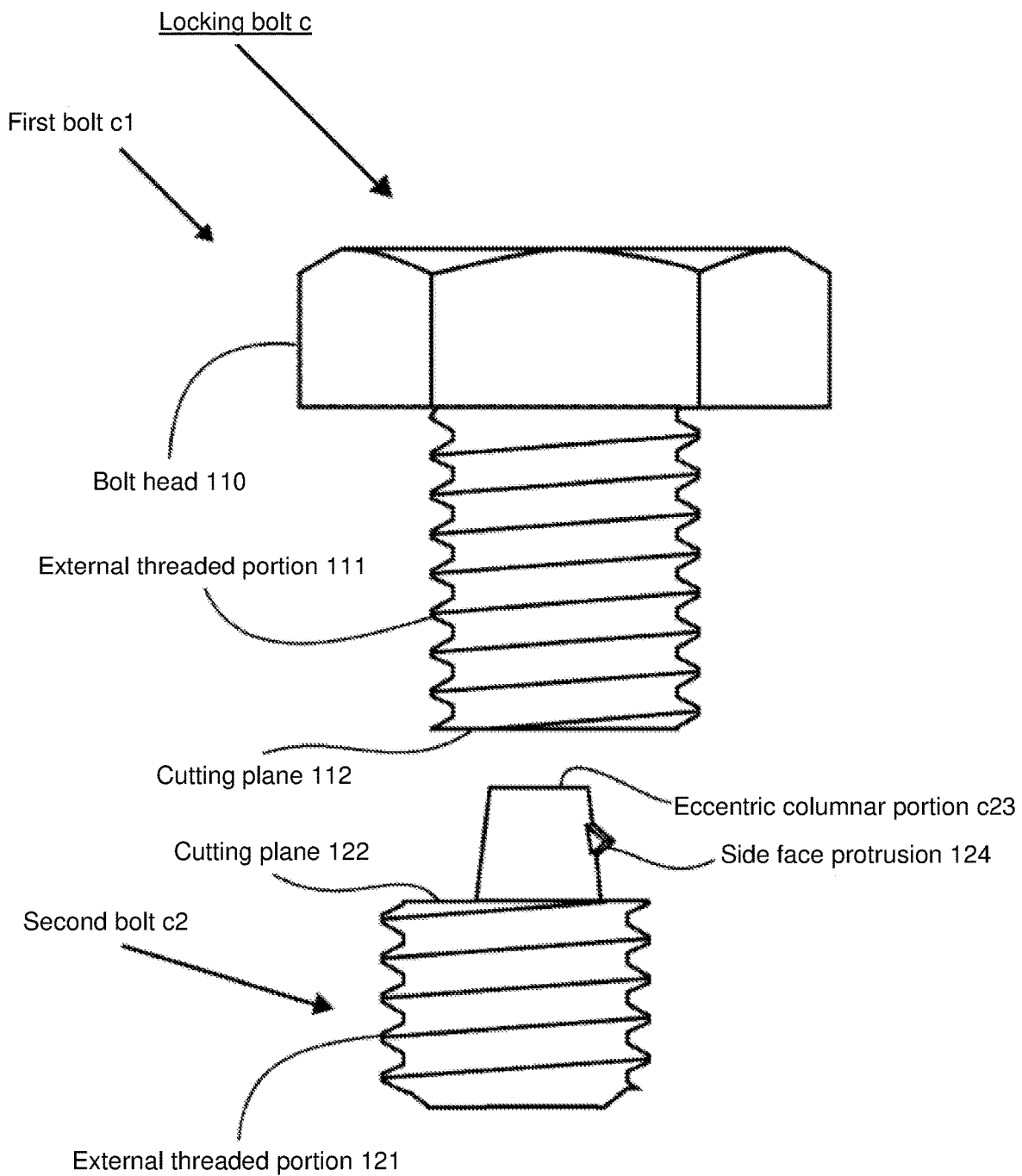
FIG. 33 Front view of locking bolt of FIG. 32.
Figure 34:
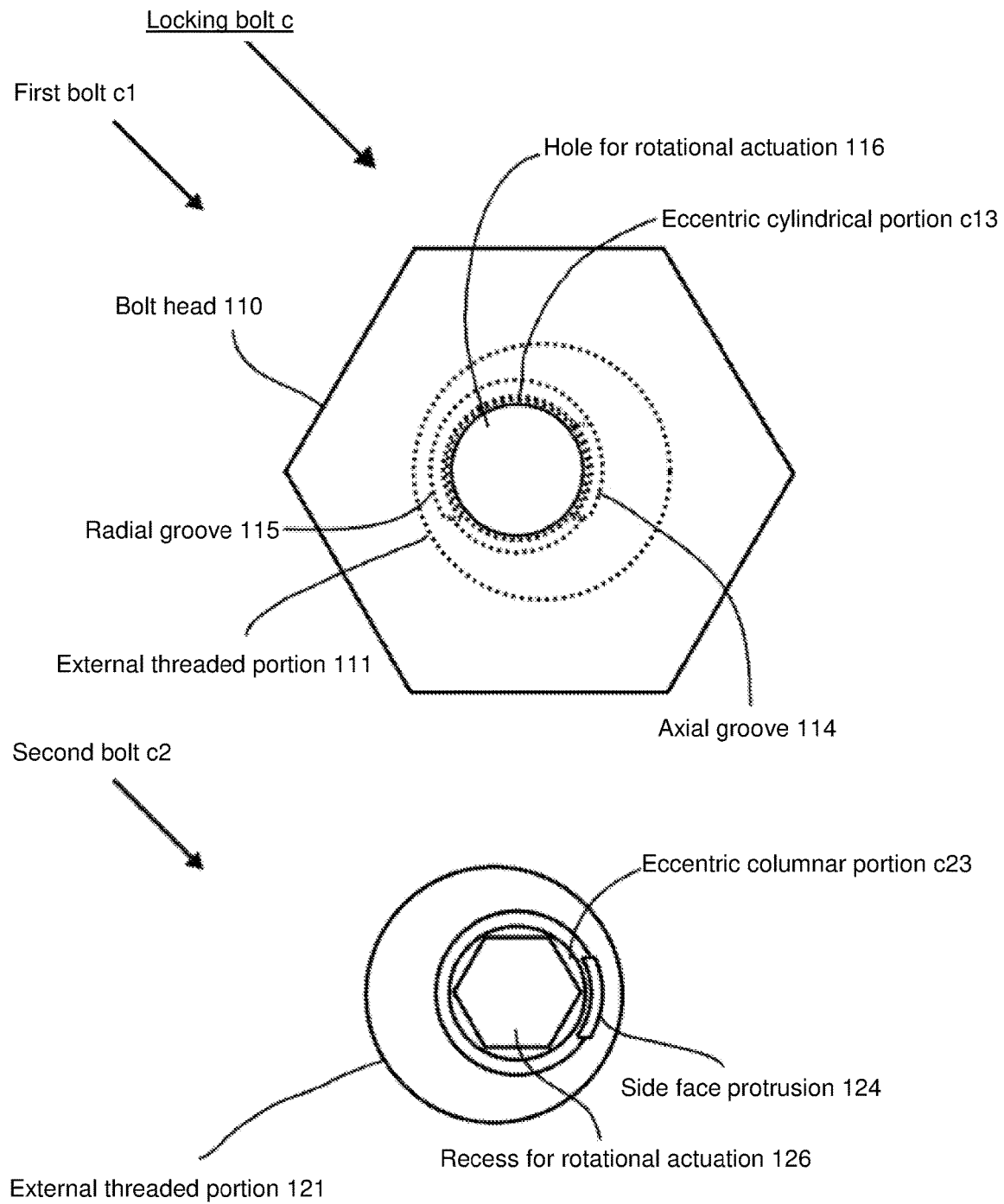
FIG. 34 Top view of locking bolt of FIG. 32.

As shown in FIG. 32, FIG. 33, and FIG. 34, where the shape of the hole at eccentric cylindrical portion c13 of first bolt c1 is made to be not columnar but frustoconical (the shape obtained when the top portion of a cone is cut by a plane parallel to the base and the pointed top portion is removed), and eccentric columnar portion c23 of second bolt c2 is made to be not columnar but frustoconical, it will also be possible achieve operation and function similar to those of locking bolt 1 indicated at Working Example 1, and it will be possible to obtain antiloosening effect in a manner that is easy and rapid as well as robust and reliable.

EXPLANATION OF REFERENCE NUMERALS

1 Locking bolt
  11 First bolt
    110 Bolt head
    111 External threaded portion
    112 Cutting plane
    113 Eccentric cylindrical portion
    114 Axial groove
    115 Radial groove
    116 Hole for rotational actuation
    117 Rotation-stopping groove
  12 Second bolt
    121 External threaded portion
    122 Cutting plane
    123 Eccentric columnar portion
    124 Side face protrusion
    126 Recess for rotational actuation
    127 Rotation-stopping protrusion
  13 Bolt hole
  14 Member
  15 Rotational actuation tool
2 Locking bolt
  21 First bolt
    210 Bolt head
  22 Second bolt
    225 Recess for rotational actuation
  23 Bolt hole
  24 Member
  25 Rotational actuation tool
3 Locking bolt
  32 Second bolt
    326 Eccentric columnar portion for rotational actuation
    327 Head of bolt for rotational actuation
4 Locking bolt
  41 First bolt
    410 Bolt head
    411 External threaded portion
    412 Cutting plane
  42 Second bolt
    421 External threaded portion
    422 Cutting plane
5 Locking bolt
  51 First bolt
    513 Eccentric columnar portion
    514 Side face protrusion
    516 Hole for rotational actuation
  52 Second bolt
    523 Eccentric cylindrical portion
    524 Axial groove
    525 Radial groove
    526 Recess for rotational actuation
6 Locking bolt
  61 First bolt
    613 Eccentric cylindrical portion
    614 Side face protrusion
  62 Second bolt
    623 Eccentric columnar portion
    624 Axial groove
    625 Radial groove
7 Locking bolt
  71 First bolt
    713 Eccentric columnar portion
    714 Axial groove
    715 Radial groove
  72 Second bolt
    723 Eccentric cylindrical portion
    724 Side face protrusion
8 Locking bolt
  81 First bolt
    813 Eccentric cylindrical portion
    814a Axial groove
    814b Axial groove
    815a Radial groove
    815b Radial groove
  82 Second bolt
    823 Eccentric columnar portion
    824a Side face protrusion
    824b Side face protrusion
9 Locking bolt
  91 First bolt
    913 Eccentric cylindrical portion
    915 Radial groove
  92 Second bolt
    923 Eccentric columnar portion
    924 Side face protrusion
a Locking bolt
  a1 First bolt
    a13 Eccentric cylindrical portion
    a15 Radial groove
  a2 Second bolt
    a23 Eccentric columnar portion
    a24 Side face protrusion b Locking bolt
   b1 First bolt
      b13 Eccentric cylindrical portion
      b14 Axial groove
c Locking bolt
   c1 First bolt
      c13 Eccentric cylindrical portion
   c2 Second bolt
      c23 Eccentric columnar portion

The invention claimed is:

1. A locking bolt comprising, in such form as if a single bolt had been cut into two at a cutting plane perpendicularly with respect to an axis thereof at a location midway along the axis thereof, a first bolt having a bolt head and a second bolt having a threaded tip, wherein the locking bolt is such that:

the first bolt and the second bolt respectively have, at the outside circumference of the bolt shaft of each of the bolts, male threads that threadedly engage with a single bolt hole;

at the second bolt, an eccentric columnar portion which is smaller in diameter than a diameter of the second bolt is provided at the cutting plane between it and the first bolt in such fashion as to protrude outward in the axial direction in eccentric fashion with respect to a direction perpendicular to the central axis of the second bolt, and a side face protrusion is formed at a portion of an outside circumferential side face of the eccentric columnar portion in such fashion as to protrude outward in a radial direction;

at the first bolt, an eccentric cylindrical portion which is a cylindrical hole that is smaller in diameter than the diameter of a shaft of the first bolt and that mates with the eccentric columnar portion provided at the second bolt is formed at the cutting plane of the first bolt in eccentric fashion with respect to a direction perpendicular to the central axis of the first bolt, an axial groove being formed in a direction parallel to the central axis and a radial groove being formed in a direction perpendicular to the central axis at an inside circumferential side face thereof;

after the side face protrusion of the eccentric columnar portion and the axial groove of the eccentric cylindrical portion are aligned and the eccentric columnar portion provided at the second bolt is captured within the eccentric cylindrical portion provided at the first bolt to the point where the cutting planes come in contact in mutually opposed fashion, causing movement of the side face protrusion of the eccentric columnar portion along the radial groove of the eccentric cylindrical portion until an end of the radial groove is reached as a result of rotation of the second bolt results in a constitution in which pitches and central axes of external threaded portions of the two are aligned; and the second bolt is provided with a recess for rotational actuation.

2. The locking bolt according to claim 1 wherein the side face protrusion is provided in such fashion as to protrude inward in the radial direction at a portion of the inside circumferential side face of the eccentric cylindrical portion of the first bolt, and the axial groove and the radial groove are formed at an outside circumferential side face of the eccentric columnar portion of the second bolt.

3. The locking bolt according to claim 1 wherein a hole extending all the way through the first bolt in a direction parallel to the central axis of the first bolt is formed at the first bolt.

4. The locking bolt according to claim 1 wherein when there is an eccentric columnar portion at the second bolt, a recess such as will permit rotational actuation from the exterior is provided at a top portion of the eccentric columnar portion; and when there is an eccentric cylindrical portion at the second bolt, a recess such as will permit rotational actuation from the exterior is provided at a bottom portion of the eccentric cylindrical portion.

5. The locking bolt according to claim 1 wherein a recess such as will permit rotational actuation from the exterior is provided at a threaded tip face on a side opposite the cutting plane of the second bolt.

6. The locking bolt according to claim 1 further comprising a rotation-stopping feature such that a small protrusion which is distinct from the eccentric columnar portion is provided at the cutting plane of the first bolt or the second bolt, and a semicircular groove which is concentric with respect to the eccentric cylindrical portion but which is distinct from the eccentric cylindrical portion is provided at the opposite cutting plane, and such that after these are mated to the point where a state is reached in which the mutual cutting planes of the first bolt and the second bolt come in contact, rotation of only the second bolt causes mutual engagement of the small protrusion and an end of the semicircular groove to occur at a place where the pitches and the central axes of the external threaded portions of the two are aligned, preventing the second bolt from rotating further.

7. The locking bolt according to claim 1 wherein the radial groove is one among a plurality of radial grooves that are provided thereat.

8. The locking bolt according to claim 1 wherein the axial groove is one among a plurality of axial grooves that are provided thereat.

9. The locking bolt according to claim 1 wherein the side face protrusion is one among a plurality of side face protrusions that are provided thereat.

10. The locking bolt according to claim 1 wherein the radial groove is inclined slightly with respect to the radial direction.

11. The locking bolt according to claim 1 wherein the axial groove is inclined slightly with respect to the direction of the central axis.

12. The locking bolt according to claim 1 wherein a rod is provided which is integral to the recess permitting rotational actuation from the exterior that is provided at the second bolt, the rod which is integral to the recess permitting rotational actuation from the exterior which is provided at the second bolt being such that, when the eccentric columnar portion provided at the cutting plane is made to mate with the eccentric cylindrical portion to the point where the cutting planes come in contact, rotational actuation of the second bolt from the exterior is made possible due to the fact that a tip of the rod emerges to the exterior of the first bolt as a result of its being made to pass through the hole which extends all the way through the first bolt.

13. The locking bolt according to claim 1 wherein the external threads of the first bolt and the external threads of the second bolt comprise tapered threads.

14. The locking bolt according to claim 1 wherein
the eccentric columnar portion is frustoconical (the shape obtained when the top portion of a cone is cut by a plane parallel to the base and the pointed top portion is removed), and the eccentric cylindrical portion is a frustoconical hole.

15. A locking bolt comprising, in such form as if a single bolt had been cut into two at a cutting plane perpendicularly with respect to an axis thereof at a location midway along the axis thereof, a first bolt having a bolt head and a second bolt having a threaded tip, wherein the locking bolt is such that:
- the first bolt and the second bolt respectively have, at the outside circumference of the bolt shaft of each of the bolts, male threads that threadedly engage with a single bolt hole;
- at the first bolt, an eccentric columnar portion which is smaller in diameter than the diameter of a shaft of the first bolt is provided at the cutting plane between it and the second bolt in such fashion as to protrude outward in the axial direction in eccentric fashion with respect to a direction perpendicular to the central axis of the first bolt, and a side face protrusion is formed at a portion of an outside circumferential side face of the eccentric columnar portion in such fashion as to protrude outward in a radial direction;
- at the second bolt, an eccentric cylindrical portion which is a cylindrical hole that is smaller in diameter than the diameter of a shaft of the second bolt and that mates with the eccentric columnar portion provided at the first bolt is formed at the cutting plane of the second bolt in eccentric fashion with respect to a direction perpendicular to the central axis of the second bolt, an axial groove being formed in a direction parallel to the central axis and a radial groove being formed in a direction perpendicular to the central axis at an inside circumferential side face thereof;
- after the side face protrusion of the eccentric columnar portion and the axial groove of the eccentric cylindrical portion are aligned and the eccentric columnar portion provided at the first bolt is captured within the eccentric cylindrical portion provided at the second bolt to the point where the cutting planes come in contact in mutually opposed fashion, causing movement of the side face protrusion of the eccentric columnar portion along the radial groove of the eccentric cylindrical portion until an end of the radial groove is reached as a result of rotation of the first bolt results in a constitution in which pitches and central axes of external threaded portions of the two are aligned; and
- the second bolt is provided with a recess for rotational actuation.

16. The locking bolt according to claim 15 wherein
the side face protrusion is provided in such fashion as to protrude inward in the radial direction at a portion of the inside circumferential side face of the eccentric cylindrical portion of the second bolt, and the axial groove and the radial groove are formed at an outside circumferential side face of the eccentric columnar portion at the first bolt.

* * * * *